(12) United States Patent
Le et al.

(10) Patent No.: US 10,139,517 B2
(45) Date of Patent: Nov. 27, 2018

(54) HYBRID IMAGE OF EARTH FORMATION BASED ON TRANSIENT ELECTROMAGNETC MEASUREMENTS

(71) Applicants: Fei Le, Houston, TX (US); Gregory B. Itskovich, Houston, TX (US); Marina N. Nikitenko, Novosibirsk (RU)

(72) Inventors: Fei Le, Houston, TX (US); Gregory B. Itskovich, Houston, TX (US); Marina N. Nikitenko, Novosibirsk (RU)

(73) Assignee: BAKER HUGES, A GE COMPANY LLC, Houston, TX (US)

( * ) Notice: Subject to any disclaimer, the term of this patent is extended or adjusted under 35 U.S.C. 154(b) by 918 days.

(21) Appl. No.: 14/577,663

(22) Filed: Dec. 19, 2014

(65) Prior Publication Data

US 2016/0178787 A1    Jun. 23, 2016

(51) Int. Cl.
  G01V 3/38 (2006.01)
  G01V 3/28 (2006.01)
  G01V 3/24 (2006.01)

(52) U.S. Cl.
  CPC .................. *G01V 3/38* (2013.01); *G01V 3/24* (2013.01); *G01V 3/28* (2013.01)

(58) Field of Classification Search
  CPC ......................................................... G01V 3/38
  See application file for complete search history.

(56) References Cited

U.S. PATENT DOCUMENTS

| | | |
|---|---|---|
| 7,150,316 B2 | 12/2006 | Itskovich |
| 7,167,006 B2 | 1/2007 | Itskovich |
| 7,356,411 B1 | 4/2008 | Stoyer et al. |
| 7,474,101 B2 | 1/2009 | Strack |
| 7,538,555 B2 | 5/2009 | Banning et al. |

(Continued)

OTHER PUBLICATIONS

Donald, et al.; "Real-Time and Time-Lapsed LWD Density Images for Managing Wellbore Stability of Weak Overburden Shale: Case Study for the Bream Field, OffShore Norway"; (2011); SPWLA 52nd Annual Logging Symposium; 9 pages.

(Continued)

*Primary Examiner* — John Breene
*Assistant Examiner* — Jeffrey C Morgan
(74) *Attorney, Agent, or Firm* — Cantor Colburn LLP

(57) ABSTRACT

A method for imaging an earth formation includes estimating an apparent resistivity (AR) value and an apparent distance to a bedding plane (AD2B) value for each of a plurality of samples derived from measurements of a time-dependent transient electromagnetic signal, estimating an inversion-based resistivity value (IB-R) and an inversion-based distance to a bedding plane (IB-D2B) value at a first sample of each consecutive depth interval, wherein each depth interval includes a plurality of consecutive samples, and determining a difference between apparent values and the corresponding inversion-based values. The method further includes generating an image of the earth formation using the AR and AD2B values for the entire interval if the difference is less than a threshold value and generating an image of the earth formation using IB-R and IB-D2B values for the entire interval if the difference is greater than the threshold value.

17 Claims, 31 Drawing Sheets

(56) References Cited

U.S. PATENT DOCUMENTS

| | | | |
|---|---|---|---|
| 8,004,282 B2* | 8/2011 | Itskovich | G01V 3/28 324/324 |
| 8,035,392 B2 | 10/2011 | Itskovich | |
| 8,049,507 B2 | 11/2011 | Rabinovich et al. | |
| 8,085,049 B2 | 12/2011 | Bittar | |
| 8,239,172 B2 | 8/2012 | Reiderman et al. | |
| 8,356,673 B2 | 1/2013 | Bass et al. | |
| 8,624,969 B2 | 1/2014 | Zhdanov | |
| 2007/0108981 A1 | 5/2007 | Geertsma-Banning et al. | |
| 2007/0216416 A1 | 9/2007 | Itskovich | |
| 2007/0256832 A1 | 11/2007 | Hagiwara et al. | |
| 2009/0237084 A1 | 9/2009 | Itskovich et al. | |
| 2010/0007348 A1 | 1/2010 | Fang et al. | |
| 2010/0134111 A1 | 6/2010 | Itskovich | |
| 2011/0080172 A1 | 4/2011 | Banning-Geertsma et al. | |
| 2011/0166842 A1 | 7/2011 | Geertsma-Banning et al. | |
| 2011/0257886 A1 | 10/2011 | Itskovich et al. | |
| 2012/0059586 A1* | 3/2012 | Itskovich | G01V 3/28 702/7 |
| 2012/0215448 A1 | 8/2012 | Hu | |
| 2013/0297214 A1 | 11/2013 | Reiderman | |
| 2014/0121974 A1 | 5/2014 | Itskovich | |
| 2014/0136115 A1* | 5/2014 | Nikitenko | G01V 3/28 702/7 |
| 2014/0288834 A1 | 9/2014 | Itskovich et al. | |
| 2015/0160367 A1 | 6/2015 | Le et al. | |

OTHER PUBLICATIONS

Dutta, et al., "Modeling Tools for Drilling, Reservoir Navigation, and Formation Evaluation", Drilling & Evaluation Research, Baker Hughes, 2001, 6 pages.

Market, et al.; "Introducing the First LWD Crossed-Dipole Sonic Imaging Service"; (2011); SPWLA 52nd Annual Logging Symposium; 16 pages.

Ortenzi, et al.; "New Azimuthal Resistivity and High Resolutions Imager Facilities Formation Evaluation and Well Placement of Horizontal Slim Boreholes"; (2011); SPWLA 52nd Annual Logging Symposium; 13 pages.

Song, et al. "Research on Transient Electromagnetic Response of Magnetic Source in Borehole", Chinese Journal of Geophysics, vol. 54, No. 2, 2011, pp. 264-275.

Strack, et al., "Full Field Array ElectroMagnetics for hydrocarbon reservoir exploratin and monitoring", Geohorizons, Jan. 2013, pp. 32-43.

Xue, et al., "3D pseudo-seismic imaging of transient electromagnetic datea—a fesibility study", 2013 European Association of Geoscientists & Engineers, Geophysical Prospecting, Sep. 2013, pp. 561-571.

Notification of Transmittal of the International Search Report and the Written Opinion of the International Searching Authority, or the Declaration; PCT/US2015/066361; dated Mar. 18, 2016; 10 pages.

* cited by examiner

HYBRID IMAGE OF EARTH FORMATION BASED ON TRANSIENT ELECTROMAGNETC MEASUREMENTS

BACKGROUND

Earth formations may be used for various purposes such as hydrocarbon production, geothermal production, and carbon dioxide sequestration. In order to efficiently use an earth formation, the formation is characterized by performing measurements of many different properties using one or more tools conveyed through a borehole penetrating the formation. One category of tools includes tools that measure electrical characteristics of the earth formation such as resistivity or its inverse conductivity. For convenience in interpreting resistivity measurement data obtained by a resistivity tool, this data may be presented to a user as an image. In general, the image presents a value of resistivity as a function of depth. If the user is a drilling operator, then the image can be used by the operator to make decisions for geo-steering a drill string drilling a borehole into the formation. Hence, it would be well received in the drilling and geophysical exploration industries if the accuracy of formation images could be improved.

BRIEF SUMMARY

Disclosed is a method for imaging an earth formation. The method includes: conveying a carrier through a borehole penetrating the formation; inducing time-dependent electrical currents in the formation at a plurality of depths using a downhole resistivity tool disposed at the carrier; measuring time-dependent transient electromagnetic (TEM) signals induced by the formation responsive to the electrical currents using the downhole resistivity tool; estimating an apparent resistivity (AR) value and an apparent distance to a bedding plane (AD2B) value for each of a plurality of samples derived from the TEM measurements using a processor, wherein each sample corresponds to a discrete time window of the TEM measurements; estimating an inversion-based resistivity (IB-R) value and an inversion-based distance to a bedding plane (IB-D2B) value at a first sample of each consecutive depth interval using the processor, wherein each depth interval comprises a plurality of consecutive samples; determining a difference between the AR and AD2B values and the corresponding IB-R and IB-D2B values using the processor; generating an image of the earth formation using the AR and AD2B values for the entire interval having the first sample using the processor if the difference is less than a threshold value at the first sample; and estimating an IB-R value and an IB-D2B value for each of the samples in the entire interval and generating an image of the earth formation using the IB-R and IB-D2B values for the entire interval having the first sample if the difference is greater than the threshold value using the processor.

Also disclosed is an apparatus for imaging an earth formation. The apparatus includes: a carrier configured to be conveyed through a borehole penetrating the formation; a transmitter disposed on the carrier and configured to induce a time-dependent electrical currents in the formation; a receiver disposed on the carrier and configured to provide a time-dependent transient electromagnetic (TEM) signal induced the formation responsive to the electrical currents; a processor and a non-transitory computer-readable medium accessible to the processor with instructions thereon that when executed by the processor cause the processor to: measure a time-dependent transient electromagnetic (TEM) signals induced by the formation responsive to the electrical current using the downhole resistivity tool; estimate an apparent resistivity (AR) value and an apparent distance to a bedding plane (AD2B) value for each of a plurality of samples derived from the TEM measurements using a processor, wherein each sample corresponds to a discrete time window of the TEM measurements; estimate an inversion-based resistivity (IB-R) value and an inversion-based distance to a bedding plane (IB-D2B) value at a first sample of each consecutive depth interval, wherein each depth interval includes a plurality of consecutive samples; determine a difference between the AR and AD2B values and the corresponding IB-R and IB-D2B values using the processor; generate an image of the earth formation using the AR and AD2B values for the entire interval having the first sample using the processor if the difference is less than a threshold value at the first sample; and estimate an IB-R value and an IB-D2B value for each of the samples in the entire interval and generate an image of the earth formation using the IB-R and IB-D2B values for the entire interval having the first sample if the difference is greater than the threshold value.

Further disclosed is a non-transitory computer readable medium having computer executable instructions for imaging an earth formation that when executed by a computer implements a method. The method includes: estimating an apparent resistivity (AR) value and an apparent distance to a bedding plane (AD2B) value for each of a plurality of samples derived from measurements of time-dependent transient electromagnetic (TEM) signals in a borehole penetrating the formation responsive to a TEM current in the formation, wherein each sample corresponds to a discrete time window of the TEM measurements; estimating an inversion-based resistivity (IB-R) value and an inversion-based distance to a bedding plane (IB-D2B) value at a first sample of each consecutive depth interval, wherein each depth interval includes a plurality of consecutive samples; determining a difference between the AR and AD2B values and the corresponding IB-R and IB-D2B values using the processor; generating an image of the earth formation using the AR and AD2B values for the entire interval having the first sample using the processor if the difference is less than a threshold value at the first sample; and estimating an IB-R value and an IB-D2B value for each of the samples in the entire interval and generating an image of the earth formation using the IB-R and IB-D2B values for the entire interval having the first sample if the difference is greater than the threshold value.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
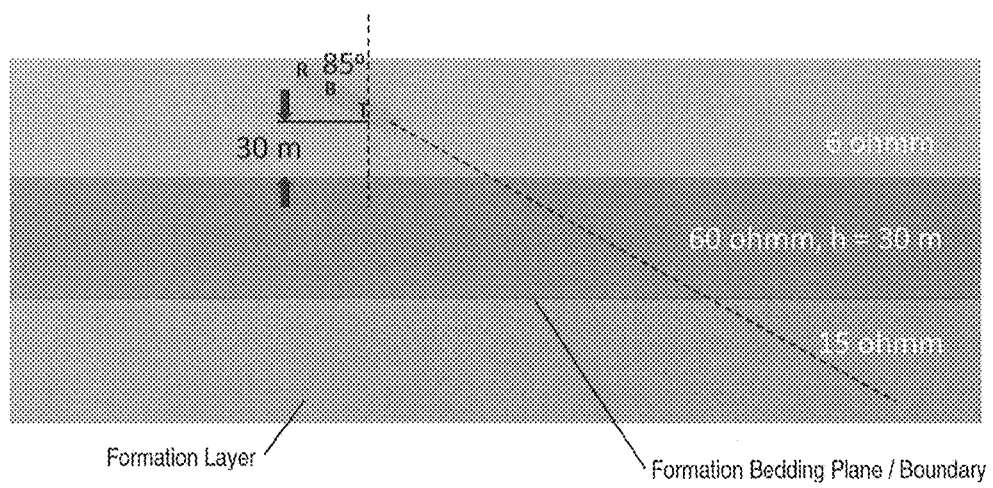
FIG. 1 depicts aspects of the 3-layered formation benchmark model.

A detailed description of one or more embodiments of the disclosed apparatus and method presented herein by way of exemplification and not limitation with reference to the figures.

Disclosed are method and apparatus for imaging an earth formation. The method and apparatus produce a hybrid image of formation geo-electrical characteristics from resistivity data obtained by a downhole resistivity tool. The resistivity data is interpreted by two different methods. One method provides apparent resistivity information about the earth formation and an apparent distance to a nearby bedding plane. This method is referred to as the AR method and the apparent distance to the bedding plane or boundary is referred to as AD2B. The other method is inversion based (IB) and relies on inversion of the resistivity data to determine those formation geo-electrical characteristics that if interrogated by the downhole resistivity tool would result in producing the obtained resistivity data. This method is referred to as the IB method. In the IB method, synthetic tool responses are pre-calculated for many types of expected formation parameters including resistivity and a number of layers to produce look-up tables. Accordingly, the obtained resistivity data may be cross-referenced in a look-up to table to find the pre-calculated formation electrical characteristics that would result in producing that data.

The AR method assumes a homogeneous borehole space and can quickly interpret resistivity data in real time. However, as the downhole resistivity tool approaches a bedding plane or boundary, the homogeneous assumption provides for a somewhat inaccurate interpretation of the measurement data. The IB method on the other hand while slower provides for a more accurate interpretation of the measurement data especially at or near bedding planes or boundaries. Hence, as disclosed herein, a hybrid image is produced using both methods. The hybrid image is more accurate than an image produced using only the AR method because the IB method is used to produce a portion of the hybrid image at or near the bedding planes or boundaries. Hence, because the AR method is used to produce a portion of hybrid image away from and between the bedding planes or boundaries and the IB method is used to produce the portion of the hybrid image at or near the bedding planes or boundaries, then the accuracy or the image can be improved while still being able to produce it quickly and in real or near real time.

Next, the concept of combining the AR method and the IB method is discussed while the AR method and the IB method are discussed individually in more detail further below. To briefly summarize, the AR method separates a continuous TEM measurement into several time windows, each time window containing multiple time samples. Within each time window, least-square curve fitting is applied to match the measurement to a hypothetical response from a homogeneous formation within the same time window. The result would be apparent resistivity values dedicated to each time window which correspond to the different diffusion depths of the magnetic field, or more commonly referred as the depths of investigation. An apparent D2B (AD2B) algorithm is developed as part of the AR methodology. It interpolates among AR curves to determine the earliest time when the TEM measurement starts to deviate from a homogeneous formation response, and assigns AD2B as the diffusion depth for that time.

Synthetic responses are generated and the AR/AD2B method generally provides reasonable estimation of formation properties when distance to bed (D2B) is large such as greater than the length of the tool for example. When D2B is small, the homogeneous formation approximation is no longer valid so that the AR/AD2B method products start to show artifacts and deviate from realistic values.

Look-up table based inversion for TEM measurements were developed to provide fast and robust estimation of formation properties with a limited number of geo-electrical parameters. It generates look-up tables of time domain responses of different formation models and then performs comparison of the measured and synthetic data to find parameters providing the best fit between the two. Unlike the AR method, the look-up table method incorporates formation models with multiple layers, therefore provides more realistic responses when the tool approaches a bed boundary. Nevertheless, same as other inversion-based methods, the look-up table inversion requires user inputs/initial guesses to select the correct tables and the range of parameters in order to reduce errors in the inverted parameters. This could be difficult when insufficient knowledge of formation is given prior drilling or when formation properties change rapidly while drilling. Speed of calculation may also be an issue for real-time applications if large look-up tables are used.

In this section, TEM imaging using the AR method based on synthetic log responses is presented with reference to FIG. 1 (more detailed discussion further below). FIG. 1 depicts aspects of the 3-layered benchmark model used in the following discussions in this discussion section. The tool has one transmitter and two receivers. The spacings are 20' and 30', respectively. The measured voltage is bucked following the $L^3$ relation $V=V_R-(20/30)^3V_B$. The transmitter uses an ideal step-function pulse shape.

The method to generate a TEM image using the AR method is briefly described here:
1. At each measured depth (MD), calculate AR based on any/combination of the main component signals (XX, YY, ZZ). Call them R=1, . . . , Rn. R1 corresponds to the AR of the earliest time window, and is used to represent the "near zone" resistivity. Rn corresponds to the AR of the latest time window, and is used to approximate the "far zone" resistivity.
2. Calculate AD2B based on the AR values.
3. Determine the direction of the boundary using the target angle (obtained from cross-component measurements).
4. Combine the above results and present them in the format of an image of the earth formation's electrical properties as a function of measured depth.

Figure 2:
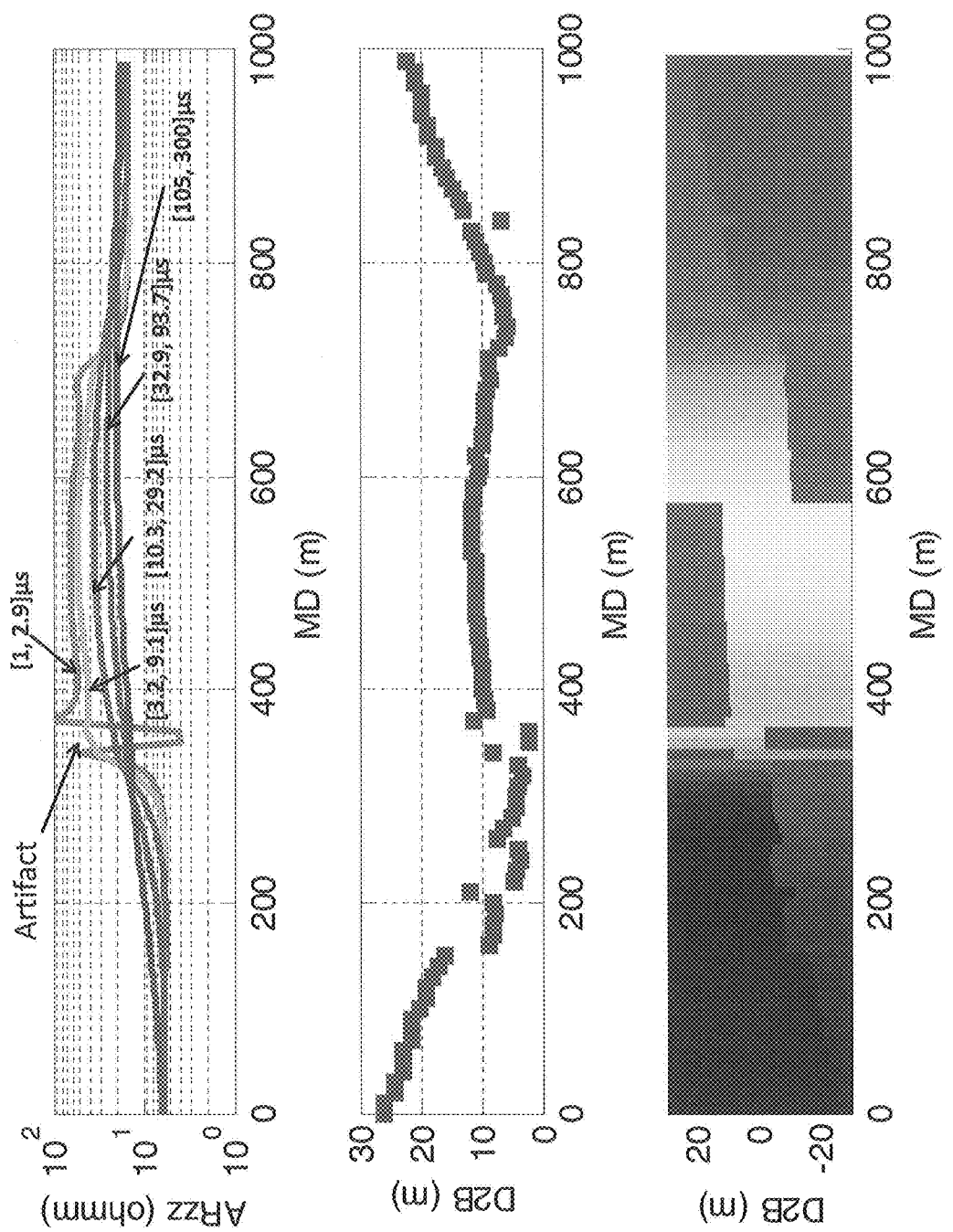
FIG. 2 depicts aspects of an apparent resistivity log, an apparent distance-to-bed log, and an apparent resistivity image generated for the formation benchmark model.

FIG. 2 illustrates the AR (a) and AD2B (b) logs, as well as the AR image (c) generated for the benchmark model. All results are based on the ZZ-component. The five time windows used for AR generation are [1, 2.9]µs, [3.2, 9.1]µs, [10.3, 29.2]µs, [32.9, 93.7]µs, and [105, 300]µs. Note that the [1, 2.9]µs curve shows a quite severe artifact while the tool crosses the upper boundary due to the limitation of the AR method. For the same reason, the AD2B log does not provide reasonable results when the tool is less than ~10 m from the boundary.

For better visual performance, the image (c) is instead generated using the second-earliest ([3.2, 9.1]µs) and the latest ([105, 300]µs) AR curves. The image is presented in "tool's view". The tool is always in the middle. The tool sits in an effective 2-layered earth formation. The AD2B and the target angle are used to determine the boundary location. The two layers are then filled with colors representing the near- and the far-zone AR values ($R_2$ and $R_5$ for this example). The process is repeated throughout the entire log.

To understand the image, at MD=0 the tool sees itself in a conductive layer (6 ohm-m) and senses a more resistive layer around 30 m below it. As drilling continues, the distance to the resistive bed reduces and eventually the tool crosses the boundary (with some artifacts) at MD-350 m. After that, the tool senses a conductive layer above as it navigates inside the resistive layer. At MD=600 m, a sudden transition of the boundary direction occurs, indicating that the tool crosses the electromagnetic mid-point and the direction of excessive conductivity is changed to downward orientation. After that, the image can be understood in a similar (but reversed) order as previously described.

In summary, the AR imaging technique provides a fast and robust method to visualize the near- and far-zone resistivity values as well as the AD2B in a simplified 2-layered formation model. It does not require any initial guesses or prior information about the formation properties. Nevertheless some challenges are also evident: when the tool is near a boundary the AD2B and AR may start to show artifacts and lose accuracy. Also for a more complex formation (even just three-layered), the simplified 2-layered model may be insufficient to represent the reality and might cause a misinterpretation.

In this section, inversion-based methods are discussed (more detailed discussion further below) and generally refer to all techniques to transform measurements to model parameters. In a general sense, the AR method described previously may also be considered as a zero-dimension inversion-based method, but since it is simple and fully automated, it may be regarded as a data processing method. In this context, "inversion-based" (IB) methods mainly refer to processes focused on look-up table one-dimension (1-D) inversion because it is relatively faster and requires less user inputs compared with other inversion techniques.

The look-up table 1-D inversion method in one or more embodiments employs three types of tables: one set of tables based on two-layered formation models (Type 1), where model parameters include the resistivity values of the two layers, the D2B, and the relative dip; two sets of tables based on three-layered formation models, where the tool stays horizontal and can be in either the upper/bottom layer (Type 2) or the middle layer (Type 3). The model parameters include the resistivity values of the three layers, and the D2Bs. Users are expected to select the tables based on existing knowledge of the formation, which may be obtained from other boreholes drilled in the same formation for example.

Figure 3:
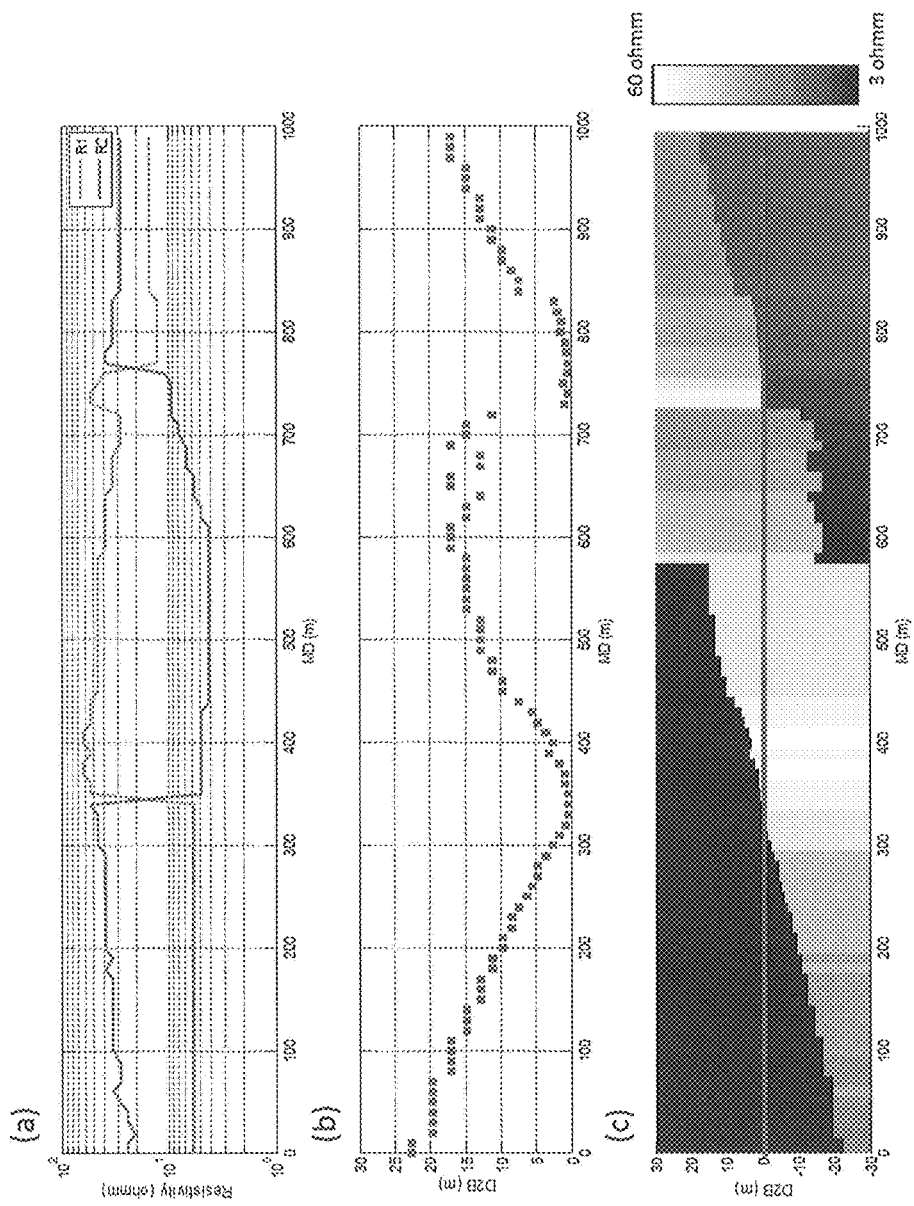
FIG. 3 depicts aspects of formation resistivity, distance-to-bed, and a formation resistivity image generated using look-up table inversion results.

FIG. 3 illustrates the result if Type 1 tables are used throughout the log interval. Panel (a) indicates the inverted resistivity values of the two layers. Panel (b) shows the inverted D2B. Panel (c) shows the image constructed in the same manner as the AR images introduced previously. Note that the image from the two-layered table inversion looks very similar to the AR images, but the D2B and the resistivity values here are more accurate than those for the AR images, especially when D2B is small. The challenge of using a look-up table is that the look-up table image takes much longer (tens of seconds) to generate compared with the AR image (instantaneously).

Figure 4:
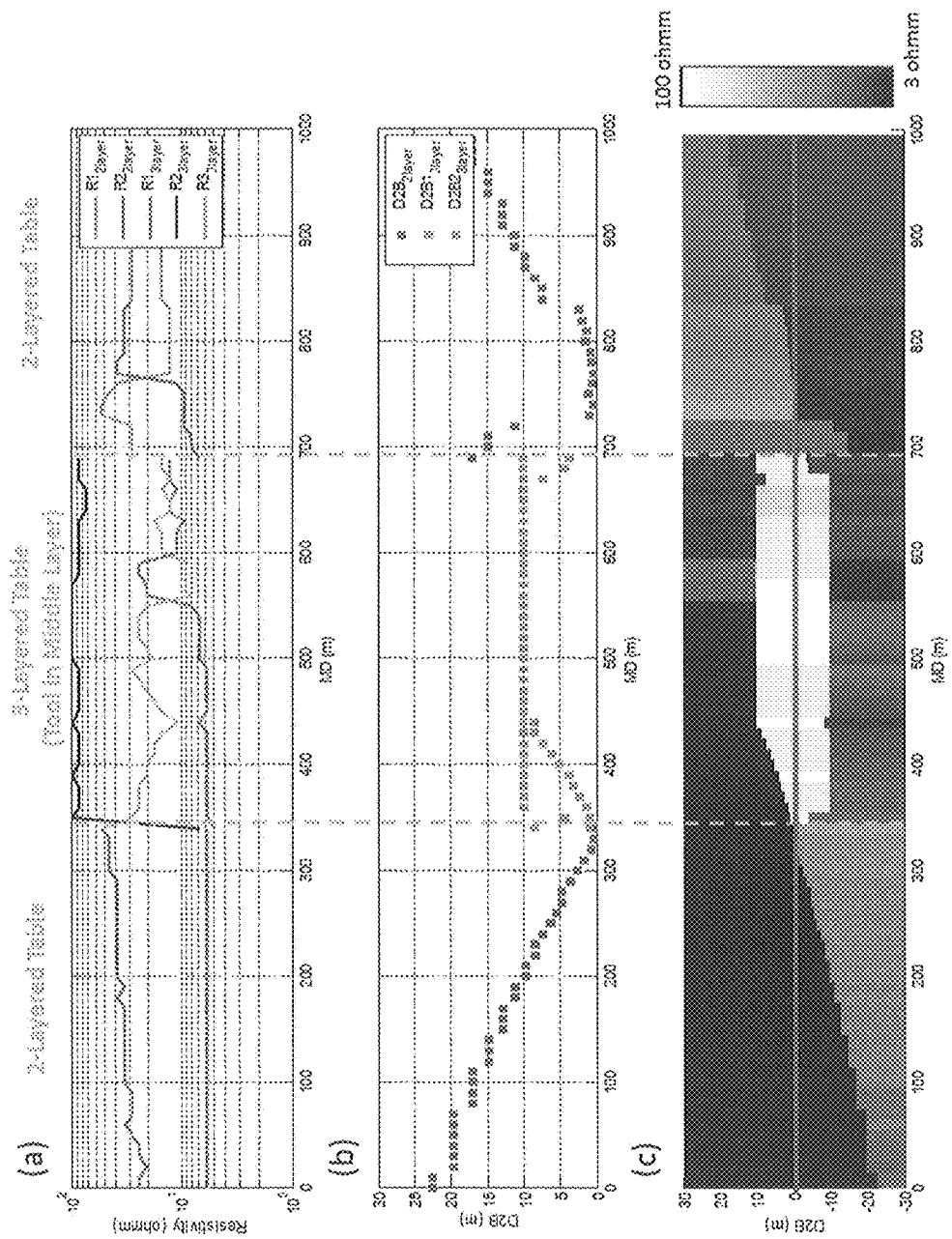
FIG. 4 depicts aspects of formation resistivity, distance-to-bed, and a formation resistivity image generated using look-up table inversion results for a three layered formation model with a resistivity tool located in the middle layer.

The accuracy of inversion results and images can be improved by improving the accuracy of knowledge of the formation and the selection of look-up tables. For this case, the optimal selection would be to use three-layered look-up tables. Specifically, Type 2 tables should be used when the tool is located in the first/third layer and Type 3 tables should be used when the tool is located in the middle layer. Alternatively, as illustrated in FIG. 4, Type 1 table (2-layered) can be used when the tool is outside the reservoir and only switch to 3-layered tables when the tool is inside the reservoir (middle layer). By comparing FIG. 4 with FIG. 3, the image looks qualitatively more reasonable when the tool is in the reservoir. The reason why the D2Bs for the 3-layered image are cut off at 10 meters is due to the limitation of the table, which also explains why the imaged resistivity of the middle layer is higher than the true value (60 ohm-m).

The pros and cons of these methods are briefly reviewed in the following Table 1.

TABLE 1

|  | Apparent Resistivity Method | Inversion-Based Methods |
| --- | --- | --- |
| Advantages | Fast, requires no initial guesses, fully automatic | More accurate determination of D2B and formation resistivity |
| Challenges | Less accurate, especially when the tool is near the boundaries | Much slower, and requires user experience and initial guesses on formation properties |

In this section, on example of a workflow to combine the merits from both apparent resistivity method and inversion-based methods for TEM real-time imaging is presented as follows:

1. Use the apparent resistivity method to obtain apparent resistivity (AR) values and apparent distances-to-bed (AD2B) at each measured depth.
2. Use the inversion-based method and obtain inversion-based resistivity (IB-R) and inversion-based distance-to-bed (IB-D2B) only at a first sample of each logging interval, where each interval includes a plurality of measured depths. Compare AR and AD2B with IB-R and IB-D2B at the inversion sample (i.e., the first sample).
3. If the difference between apparent parameters (AR and AD2B) and inverted parameters (IB-R and IB-D2B), respectively, is below a threshold value (e.g., approximately 10%-50% of the apparent or inverted parameters), generate an image with AR and AD2B for the entire interval having the inversion sample.
4. If the difference between apparent parameters (AR and AD2B) and inverted parameters (IB-R and IB-D2B), respectively, is above the threshold value, apply the inversion-based method at each measured depth within the entire interval having the inversion sample, and generate an image based on IB-R and IB-D2B.

Figure 5:
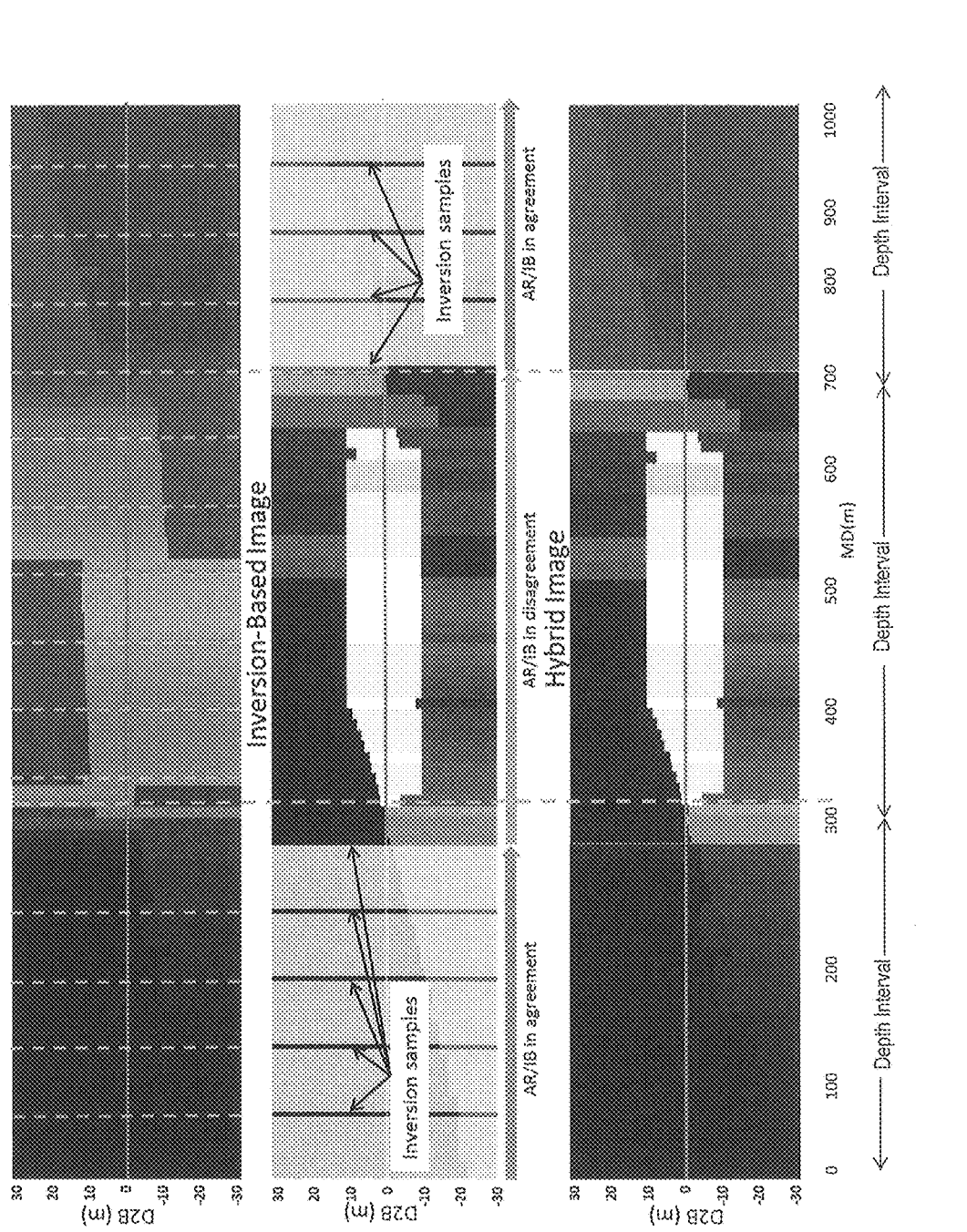
FIG. 5 depicts aspects of a hybrid image combining a portion of an apparent resistivity image with a portion of an inversion-based image.

FIG. 5 depicts aspects of a hybrid image 50 that combines aspects of the AR based image when results from AR and IB methods agree and aspects of the IB based image when results from the AR and IB methods disagree.

Figure 6:
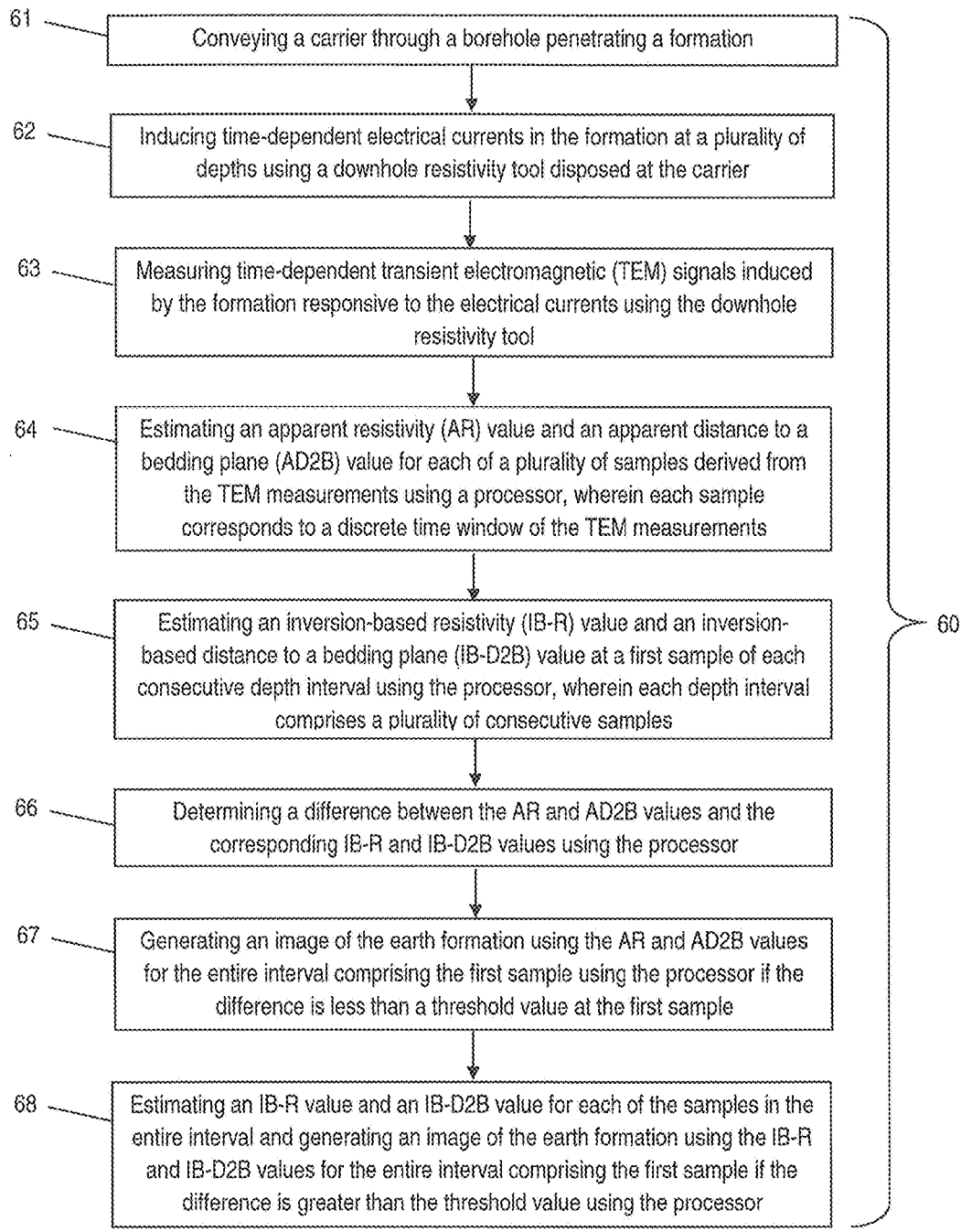
FIG. 6 is a flow chart for a method for imaging an earth formation.

FIG. 6 is a flow chart for a method 60 for imaging an earth formation. Block 61 calls for conveying a carrier through a borehole penetrating the formation. Block 62 calls for inducing time-dependent electrical currents in the formation at a plurality of depths using a downhole resistivity tool disposed at the carrier. Block 63 calls for measuring time-dependent transient electromagnetic (TEM) signals induced by the formation responsive to the electrical currents using the downhole resistivity tool. Block 64 calls for estimating an apparent resistivity (AR) value and an apparent distance to a bedding plane (AD2B) value for each of a plurality of samples derived from the TEM measurements using a processor, wherein each sample corresponds to a discrete time window of the TEM measurements. Block 65 calls for estimating an inversion-based resistivity (IB-R) value and an inversion-based distance to a bedding plane (IB-D2B) value at a first sample of each consecutive depth interval, wherein each depth interval includes a plurality of consecutive samples. Block 66 calls for determining a difference between the AR and AD2B values and the corresponding IB-R and IB-D2B values using the processor. Block 67 calls for generating an image of the earth formation using the AR and AD2B values for the entire interval comprising the first sample using the processor if the difference is less than a threshold value at the first sample. In one or more embodiments, the threshold value may be within a range of percentages of the AR and AD2B values such as within 10% to 50% of those values. Other threshold values may also be used. Block 68 calls for estimating an IB-R value and an IB-D2B value for each of the samples in the entire interval and generating an image of the earth formation using the IB-R and IB-D2B values for the entire interval comprising the first sample if the difference is greater than the threshold value using the processor.

Next, the AR method and associated apparatus are discussed in more detail. Aspects of the present disclosure relate to apparatuses and methods for electromagnetic induction well logging for evaluating an earth formation in accordance with the AR logging technique. More specifically, the present disclosure relates to estimating and displaying properties of the formation relating to transient electromagnetic (TEM) measurements. The formation may be intersected by a wellbore and the TEM measurements may be taken in the wellbore. The TEM measurements may be used to estimate a parameter of interest. Aspects of the present disclosure facilitate the display and analysis of TEM measurements. Further aspects may include methods for conducting a drilling operation.

The present disclosure is susceptible to embodiments of different forms. There are shown in the drawings, and herein will be described in detail, specific embodiments of the present disclosure with the understanding that the present disclosure is to be considered an exemplification of the principles of the present disclosure and is not intended to limit the present disclosure to that illustrated and described herein.

Transient electromagnetic (TEM) tools are configured to effect changes in a transmitter to induce a time-dependent current in a formation. Transient signals occur in the receiver antennas, which are induced by the eddy currents in the formation. The induced signal contains information about formation characteristics. Thus, the receiver produces a response indicative of formation characteristics, such as, for example, a parameter of interest. Electronics may be configured to measure the time-dependent transient electromagnetic (TEM) signal induced by the eddy currents in the formation.

Figure 7:
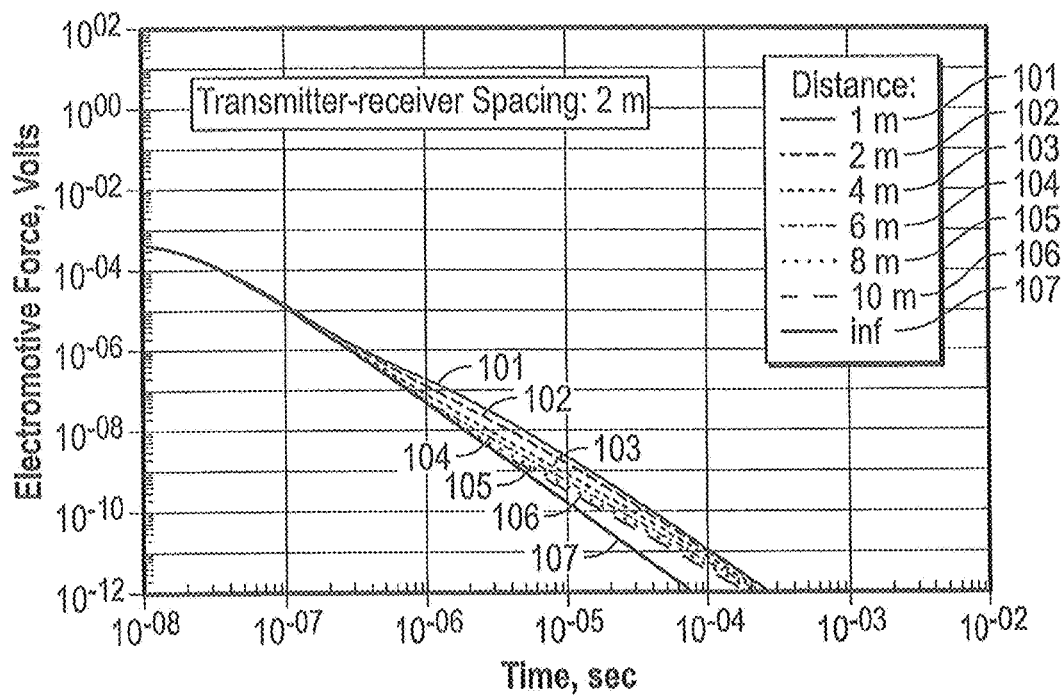
FIG. 7 shows a typical TEM response of a coaxial (ZZ) tool in accordance with embodiments of the present disclosure.

FIG. 7 shows a typical TEM response of a coaxial (ZZ) tool in accordance with embodiments of the present disclosure. In this example, the transmitter-receiver spacing is 2 meters in a two-layer model, and the resistivity values of the first and second layer are 50 Ω-m and 2 Ω-m, respectively, as described below with respect to FIG. 11A. The distance between the tool axis and the boundary varies between 1 meter and infinite. The tool is located in the first layer with its axis parallel to the boundary. Unless otherwise noted, the drawings herein are not to scale.

Responses are measured (in Volts) as the ordinate and the time is shown (in seconds) as the abscissa. Responses at distances of 1, 2, 4, 6, 8, and 10 meters are shown as 101, 102, 103, 104, 105, and 106, respectively. The response for infinite separation distance is shown as 107.

It is evident that the TEM signals by themselves are not intuitive to interpret, as all curves look similar to each other except for variations in decay rates as time progresses. Thus, interpretation of the signals is problematic.

Previous attempts to characterize the formation using TEM signals have included further processing. For traditional frequency-domain measurements, it is common practice to convert raw measurements (receiver voltages, or attenuation/phase difference among receivers) to apparent resistivity (AR) or apparent conductivity (AC) for log display and analysis purposes. AR (or AC) is defined as the resistivity (or conductivity) of a homogeneous formation, in which the tool responses match the measured responses.

More recently, formation characterization using TEM signals has included techniques involving application of a similar concept to TEM measurements. For a coaxial (ZZ) tool with transmitter-receiver spacing L in homogeneous formation of conductivity a, the induced voltage is given by:

$$u^2 = \frac{\mu_0 \sigma}{4} \frac{L^2}{t},$$

where $$V_{zz}(t) = C \frac{(\mu_0 \sigma)^{3/2}}{Bt^{5/2}} e^{-u^2}$$

C is a constant, and $\mu_0$ is the permeability of free space.

Therefore, the apparent conductivity (AC) of the voltage response for this tool at each time can be determined through:

$$C \frac{(\mu_0 \sigma_{app}(t))^{3/2}}{8t^{5/2}} e^{-u_{app}^2} = V_{zz}(t),$$

where $$u_{app}^2 = \frac{\mu_0 \sigma_{app}(t)}{4} \frac{L^2}{t}.$$

Similarly for a coplanar (XX) tool, the induced voltage is:

$$V_{xx}(t) = C \frac{(\mu_0 \sigma)^{3/2}}{8t^{5/2}} (1-\mu^2) e^{-u^2},$$

where $$u^2 = \frac{\mu_0 \sigma}{4} \frac{L^2}{t},$$

C is a constant, and the AC is determined through:

$$C \frac{(\mu_0 \sigma_{app}(t))^{3/2}}{8t^{5/2}} (1 - u_{app}(t)^2) e^{-u_{app}^2} = V_{zz}(t),$$

where $$u_{app}(t)^2 = \frac{\mu_0 \sigma_{app}(t)}{4} \frac{L^2}{t}$$

The apparent resistivity (AR) can straightforwardly be determined through the relation AR=1/AC. Also, note that AR and AC only have meanings for main-component measurements (XX, YY, ZZ) since responses for cross-component measurements (XY, XZ, YX, YZ, ZX, ZY) in a homogeneous formation are zero.

Figure 8:
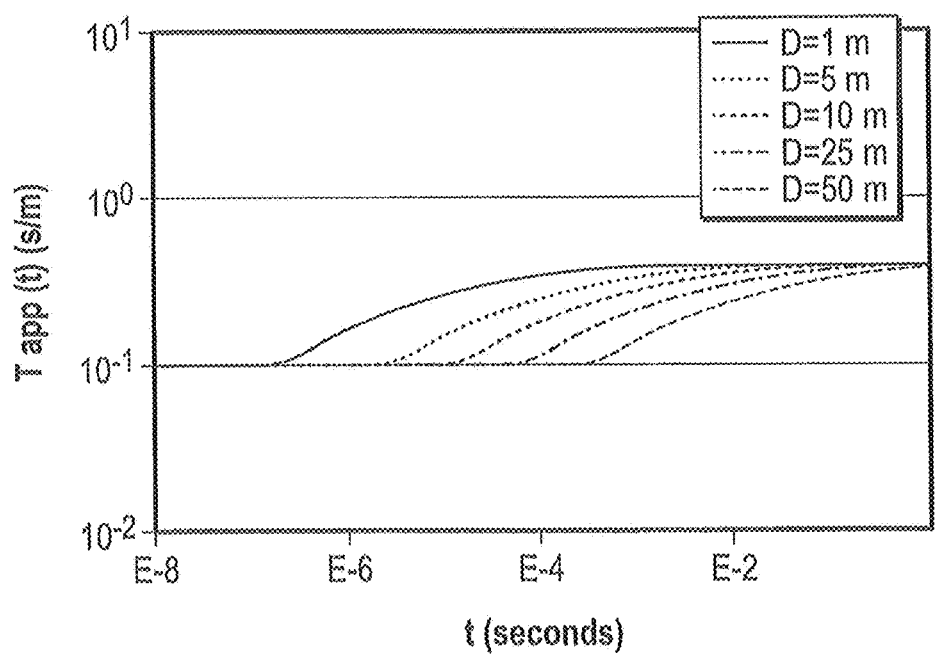
FIG. 8 illustrates a graphic representation of the time-varying AC of a coaxial tool in a two-layer formation environment for a variety of distance-to-bed values.

FIG. 8 illustrates a graphic representation of the time-varying AC of a coaxial tool in a two-layer formation environment for a variety of distance-to-bed values. The tool has 1-meter spacing in a 2-layer formation environment for a variety of distance-to-bed values (D). As illustrated here, in previous methodologies, AC has been generated as a function of time. In graphic depiction, at each logging depth a set of time-dependent AC/AR curves may be generated. It is difficult to display AC and/or AR, with such format and notation, on a traditional log track and compare side-to-side with other frequency-domain measurements.

Figure 9A:
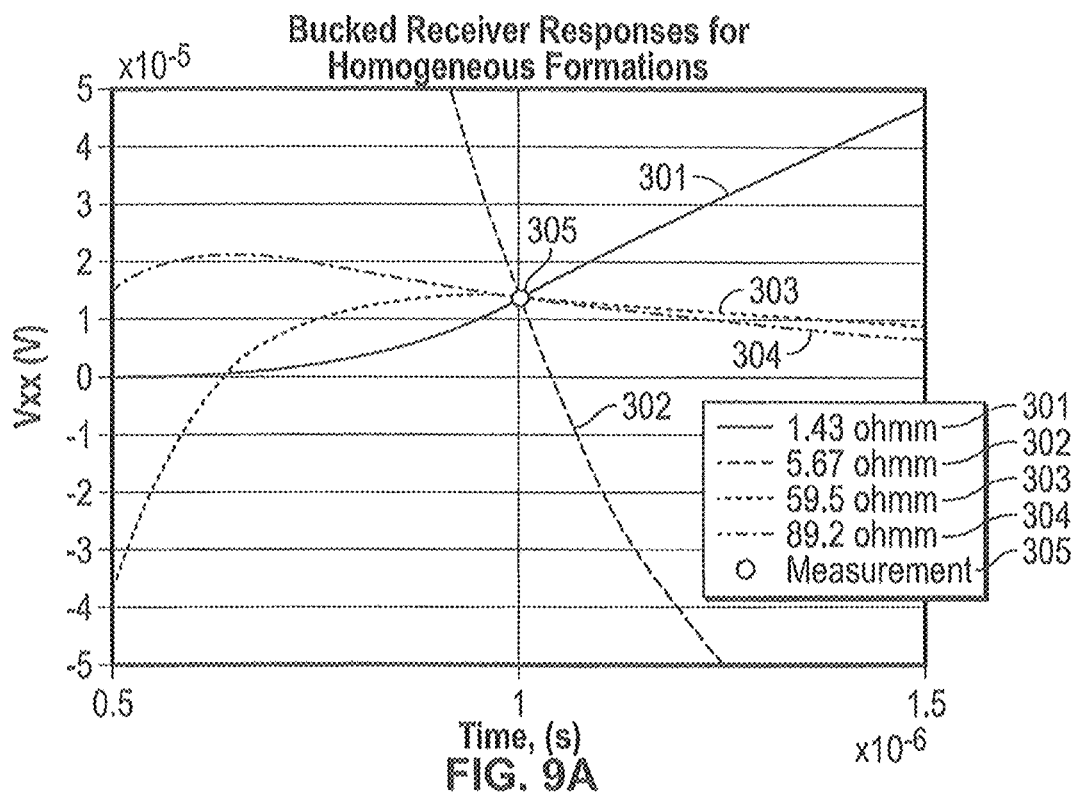
FIG. 9A is an illustration of bucked receiver responses of a coplanar (XX) tool in various homogeneous formations for a time range of 0.5 to 1.5 microseconds.

Referring to FIG. 9A, the AR values at each logging depth are determined by matching measured voltage at a particular time sample with homogeneous formation responses of the same time sample. According to the traditional method, if more than one AR value is found at a particular time sample, the algorithm selects the AR value that is closest to the AR of an adjacent time sample of the same logging depth. As is readily apparent, previous techniques also suffer from the problem of possible non-unique results. That is, more than one AR (and/or AC) value can match a measurement at a particular time.

FIG. 9A is an illustration of bucked receiver responses of a coplanar (XX) tool in various homogeneous formations for a time range of 0.5 to 1.5 microseconds. In measurement-while-drilling ('MWD'), for example, bucking is used to compensate for the signal from conductive drill pipe. The tool has one transmitter and two receivers with transmitter-receiver spacing of 20 ft and 30 ft respectively. Referring to FIG. 3A, the bucked voltage is determined through:

$$V_{bucked}(t) = V_{30ft}(t) - \left(\frac{20}{30}\right)^3 V_{20ft}(t).$$

FIG. 9A illustrates response for four homogeneous formations 301-304 having resistivity values of 1.43 ohm-m, 5.67 ohm-m, 59.5 ohm-m, and 89.2 ohm-m, respectively. It is evident from FIG. 3A that, for a given time sample, multiple formation resistivity values could lead to a same voltage reading. Each formation produces a different corresponding TEM signal 301-304, but the voltages for the four signals all measure 14.1 μV at t=1 μs. Thus, the 1 μs measurement 305 may have as many as four potential AR values, and if the 1 μs measurement 305 (which happens to be at 14.1 μV) is used in calculating AR, there will then be four equivalent AR values to select from. Such equivalence in AR determination is hard to avoid when a large range of formation resistivity values is considered. This equivalence could lead to potential errors in log presentation and interpretation.

Figure 10A:
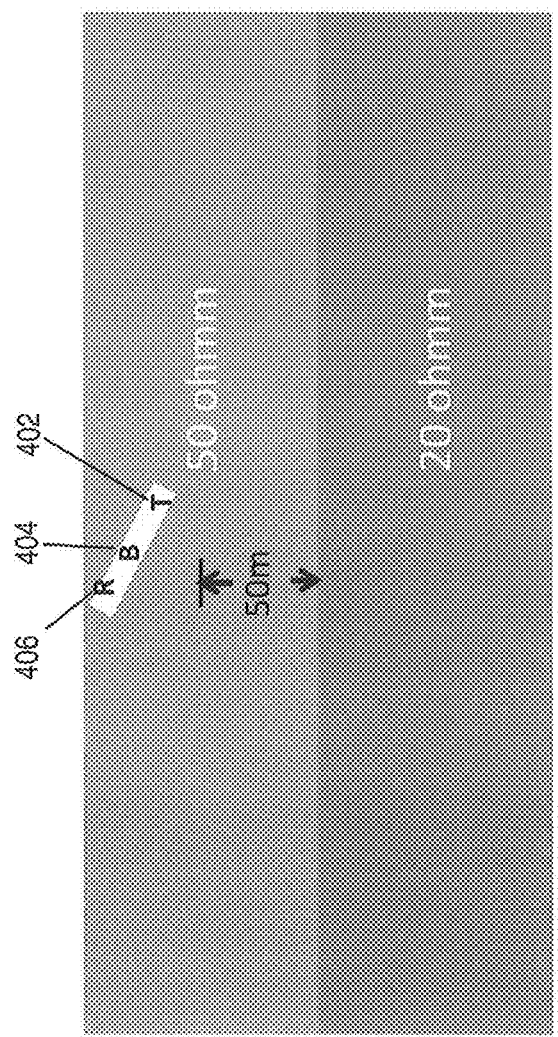
FIG. 10A illustrates an example tool configuration with respect to an earth formation in accordance with embodiments of the present disclosure.
Figure 10B:
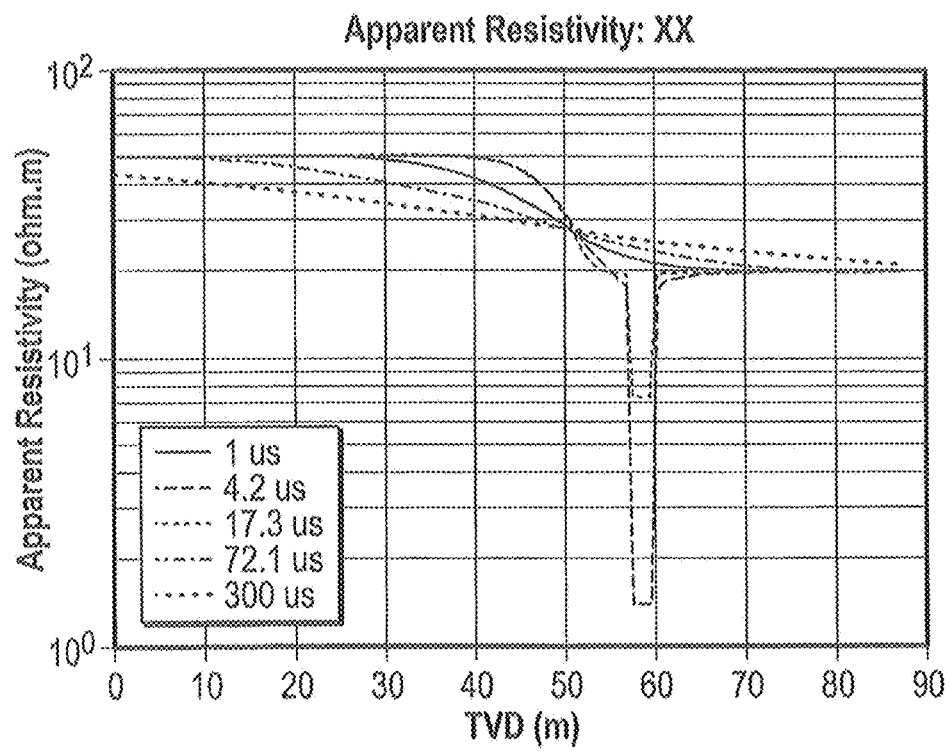
FIG. 10B illustrates an apparent resistivity log for the XX component displayed in accordance with embodiments of the present disclosure.
Figure 10C:
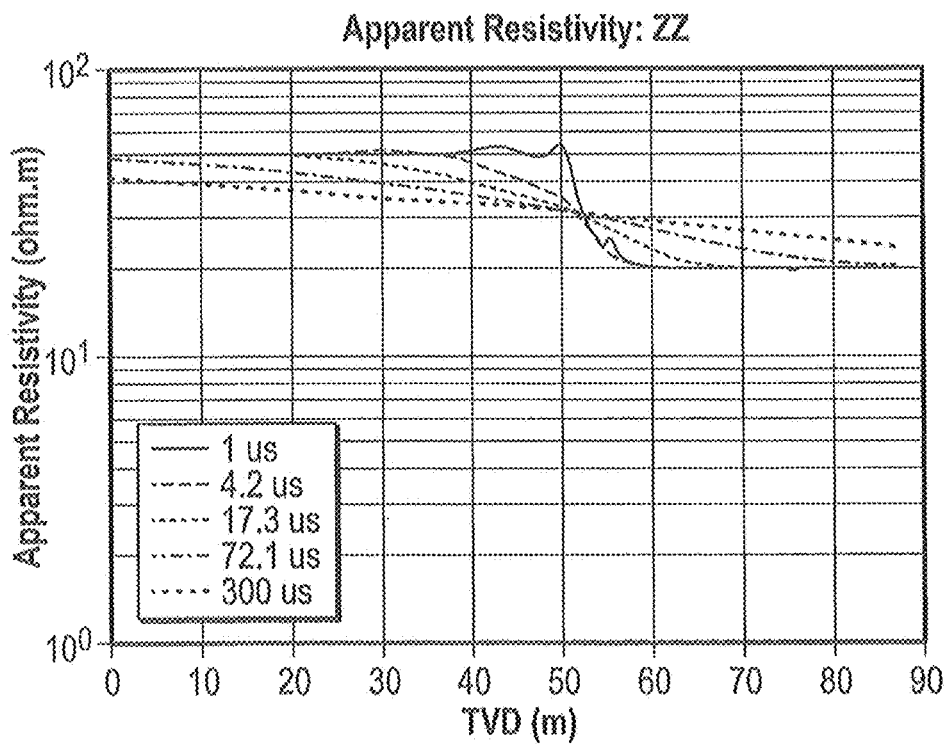
FIG. 10C illustrates an apparent resistivity log for the ZZ component displayed in accordance with embodiments of the present disclosure.

FIGS. 10A-10C illustrate the effect of non-uniqueness on AR logs generated for a three-coil tool logging through a 2-layer environment. FIG. 10A illustrates an example tool configuration with respect to an earth formation in accordance with embodiments of the present disclosure. FIG. 10B illustrates an apparent resistivity log for the XX component displayed in accordance with embodiments of the present disclosure. FIG. 10C illustrates an apparent resistivity log for the ZZ component displayed in accordance with embodiments of the present disclosure. Note that the AR logs are presented in the new format taught by the present disclosure, but that apparent resistivity is calculated according to well known methods.

Figure 9B:
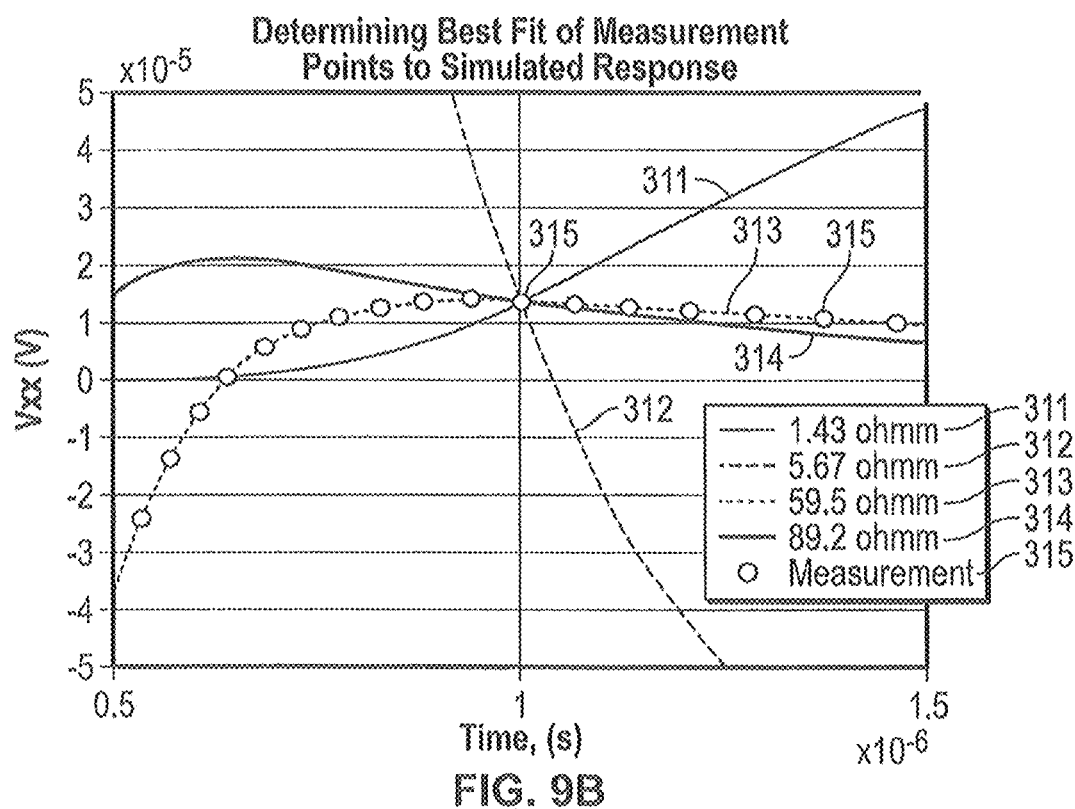
FIG. 9B illustrates techniques in accordance with embodiments of the present disclosure.

The earth model has an upper layer with resistivity of 50 ohm-m and a bottom layer with resistivity of 20 ohm-m. The tool has one transmitter 402, one bucking coil 404 (located 20 feet behind the transmitter) and a receiver coil 406 (30 feet behind the transmitter). The dip angle is 85 degrees. FIGS. 9B and 9C are the coplanar (XX) and coaxial (ZZ) AR logs at the same five time samples as used in FIGS. 9 & 8. As FIG. 9B shows, within the true vertical depth (TVD) interval of 57-60 meters the algorithm obviously fails to select correct AR values for the shallowest/earliest two curves due to equivalence. It is difficult to generalize selection among equivalent AR values to a wide range of formation properties.

Aspects of the present disclosure include methods for processing a TEM measurement for evaluation of the formation. Each measurement may be taken at a particular logging depth (e.g., borehole depth). Aspects of the present disclosure may reduce non-uniqueness while increasing robustness of the AR calculation. Embodiments may also decrease consumed bandwidth by performing downhole processing of TEM measurements into AR and sending uphole only the AR measurements, which may reduce bandwidth for the main component TEM signals by a factor of 10.

General method embodiments may include estimating apparent resistivity values for each of a plurality of samples derived from the TEM measurement, wherein each sample corresponds to a discrete time window of the TEM measurement. The samples may be mutually exclusive or may overlap in time. Some embodiments may include generating the plurality of samples by dividing the TEM measurement into a plurality of corresponding time intervals (windows). The time intervals may be of an identical duration, or may be of different durations.

In one example, for a TEM measurement with N values, the measurement is divided into n time windows corresponding roughly to n depths of investigation, so that each sample consists of N/n data points. For each sample, the Residual between the n measurements and homogeneous formation responses of the same time window is calculated for a range of resistivity R. For a given time window m (1≤m≤n), the residual is defined as:

$$Residual_m(R) = \sum_{i=(m-1)N/n+1}^{mN/n} \left( \frac{V_{meas}(t_i) - V_{homo}(R, t_i)}{|V_{homo}(R, t_i)| + \epsilon} \right)^2$$

where $V_{meas}$ is $(t_i)$ the measured voltage at time $t_i$; $V_{homo}$ (R, $t_i$) is the voltage response in a homogeneous formation with resistivity R at time $t_i$; and ε is a small positive number to prevent numerical instability. AR is estimated by finding the value R that minimizes $Residual_m$.

After AR is estimated for each sample, n AR values are associated with a corresponding one of each of the n time windows. Corresponding n AR values may then be estimated at each logging depth, and n AR curves may be generated corresponding to the n time windows.

Embodiments of the present disclosure include methods, devices, and systems for estimating a parameter of interest using a transient electromagnetic (TEM) measurement tool in a borehole intersecting an earth formation. Methods may include inducing a time-dependent current in the formation; measuring a time-dependent transient electromagnetic (TEM) signal induced by the formation responsive to the current; and estimating apparent resistivity values for each of a plurality of samples derived from the TEM measurement, wherein each sample corresponds to a discrete time window of the TEM measurement. Estimating the apparent resistivity values for each of the plurality of samples may include determining for each sample a simulated homogeneous formation that provides a best fit for the sample. Measurement, as described herein, refers to information indicative of a parameter of interest relating to the formation. The term "information" as used herein includes any form of information (analog, digital, EM, printed, etc.), and may include one or more of: raw data, processed data, and signals. Example parameters of interest may include apparent resistivity, apparent conductivity, distance to bed, distance to fluid front, and so on. This information may be obtained in near real-time.

Methods disclosed herein may also include using the parameter of interest in performing further operations in the borehole (e.g., drilling, reaming, production, etc.). Embodiments of the disclosure include estimating and applying the parameter of interest in near real-time.

FIG. 9B illustrates how non-uniqueness in AR determination may be reduced in accordance with embodiments of the present disclosure. FIG. 9B shows the bucked responses, as in FIG. 9A above, for a time window from 0.5 to 1.5 microseconds. The synthetic responses 311-315 from four simulated homogeneous formations having resistivity values of 1.43, 5.67, 59.5, and 89.2 ohm-m, respectively, are compared with a series of measurements. There are 17 measurement points 315 within the time window. In contrast with FIG. 8A, instead of selecting among four equivalent AR values using only the 1 μs measurement, the present disclosure utilizes each measurement point in the window, and fits the data to one of various homogeneous formation responses. For this particular example, it is straightforward to determine that the correct AR should be 59.5 ohm-m, because the Residual for synthetic response 313 (based on the above algorithm) is zero. The synthetic responses for the other three formation models (311, 312, 314), even though matching the measurement equally well at 1 μs, are not selected as the best fit because their residuals for the entire time window are much bigger. Through this curve-fitting scheme, non-uniqueness among the four AR values is removed, and the correct result is estimated.

Figure 11:
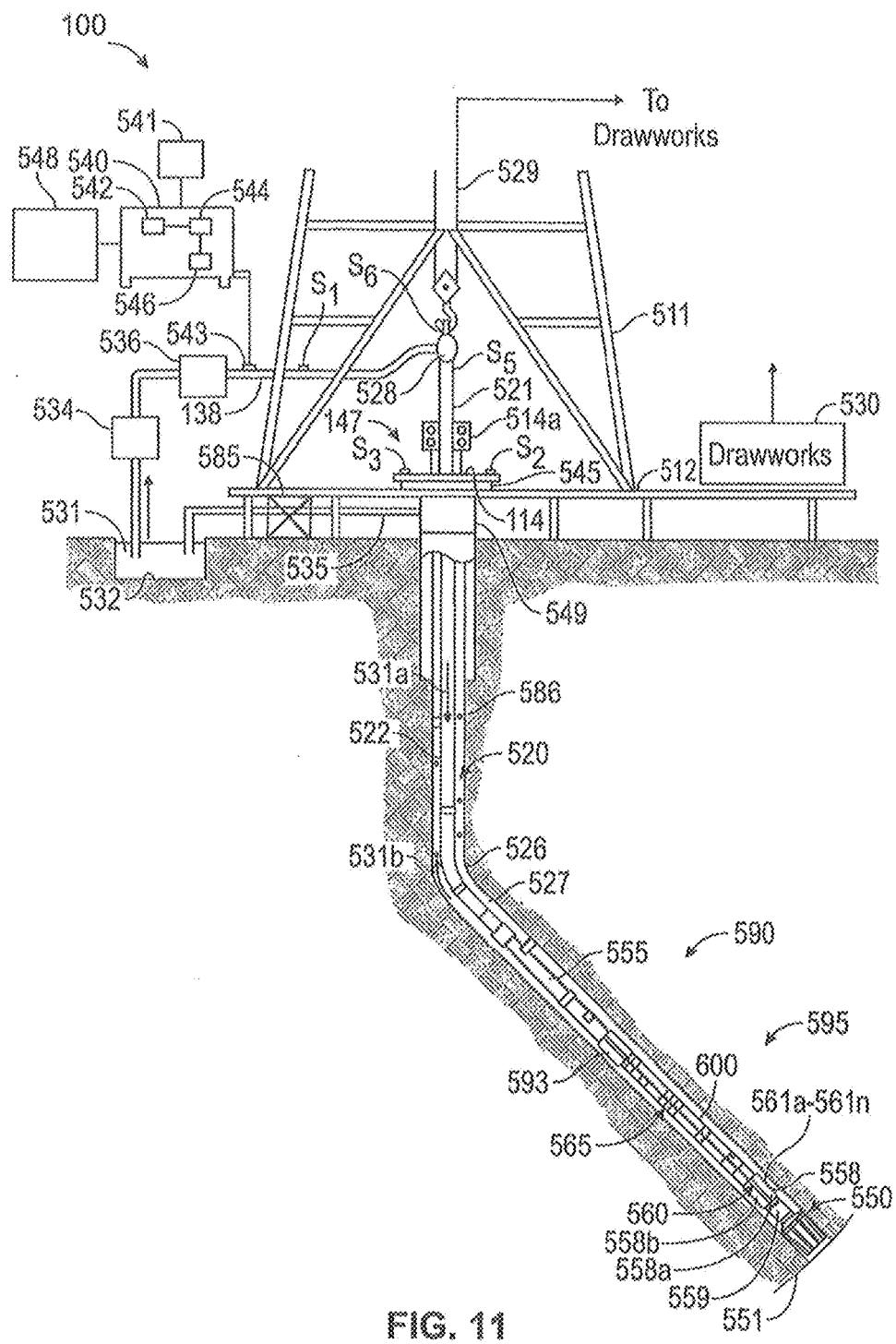
FIG. 11 is a schematic diagram of an exemplary drilling system according to one embodiment of the disclosure.

FIG. 11 is a schematic diagram of an exemplary drilling system 100 according to one embodiment of the disclosure. FIG. 11 shows a drill string 520 that includes a bottomhole assembly (BHA) 590 conveyed in a borehole 526. The drilling system 10 includes a conventional derrick 511 erected on a platform or floor 512 which supports a rotary table 514 that is rotated by a prime mover, such as an electric motor (not shown), at a desired rotational speed. A tubing (such as jointed drill pipe 522), having the drilling assembly 590, attached at its bottom end extends from the surface to the bottom 551 of the borehole 526. A drill bit 550, attached to drilling assembly 590, disintegrates the geological formations when it is rotated to drill the borehole 526. The drill string 520 is coupled to a drawworks 530 via a Kelly joint 521, swivel 528 and line 529 through a pulley. Drawworks 530 is operated to control the weight on bit ("WOB"). The drill string 520 may be rotated by a top drive (not shown) instead of by the prime mover and the rotary table 514. Alternatively, a coiled-tubing may be used as the tubing 522. A tubing injector 514a may be used to convey the coiled-tubing having the drilling assembly attached to its bottom end. The operations of the drawworks 530 and the tubing injector 514a are known in the art and are thus not described in detail herein.

A suitable drilling fluid 531 (also referred to as the "mud") from a source 532 thereof, such as a mud pit, is circulated under pressure through the drill string 520 by a mud pump 534. The drilling fluid 531 passes from the mud pump 534 into the drill string 520 via a desurger 536 and the fluid line 538. The drilling fluid 531a from the drilling tubular discharges at the borehole bottom 551 through openings in the drill bit 550. The returning drilling fluid 531b circulates uphole through the annular space 527 between the drill string 520 and the borehole 526 and returns to the mud pit 532 via a return line 535 and drill cutting screen 585 that removes the drill cuttings 586 from the returning drilling fluid 531b. A sensor S1 in line 538 provides information about the fluid flow rate. A surface torque sensor S2 and a sensor S3 associated with the drill string 520 respectively provide information about the torque and the rotational speed of the drill string 520. Tubing injection speed is determined from the sensor S5, while the sensor S6 provides the hook load of the drill string 520.

Well control system 547 is placed at the top end of the borehole 526. The well control system 547 includes a surface blow-out-preventer (BOP) stack 515 and a surface choke 549 in communication with a wellbore annulus 527. The surface choke 549 can control the flow of fluid out of the borehole 526 to provide a back pressure as needed to control the well.

In some applications, the drill bit 550 is rotated by only rotating the drill pipe 522. However, in many other applications, a downhole motor 555 (mud motor) disposed in the BHA 590 also rotates the drill bit 550. The rate of penetration (ROP) for a given BHA largely depends on the WOB or the thrust force on the drill bit 550 and its rotational speed.

A surface control unit or controller 540 receives signals from the downhole sensors and devices via a sensor 543 placed in the fluid line 538 and signals from sensors S1-S6 and other sensors used in the system 10 and processes such signals according to programmed instructions provided to the surface control unit 540. The surface control unit 540 displays desired drilling parameters and other information on a display/monitor 541 that is utilized by an operator to control the drilling operations. The surface control unit 540 may be a computer-based unit that may include a processor 542 (such as a microprocessor), a storage device 544, such as a solid-state memory, tape or hard disc, and one or more computer programs 546 in the storage device 544 that are accessible to the processor 542 for executing instructions contained in such programs. The surface control unit 540 may further communicate with a remote control unit 548. The surface control unit 540 may process data relating to the drilling operations, data from the sensors and devices on the surface, and data received from downhole; and may control one or more operations of the downhole and surface devices. The data may be transmitted in analog or digital form.

The BHA 590 may include a tool 500 configured for performing transient electromagnetic (TEM) measurements. The BHA 590 may also contain other formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 595 surrounding the BHA 590. For convenience, all such sensors are generally denoted herein by numeral 565. The BHA 590 may further include a variety of other sensors and devices 559 for determining one or more properties of the BHA 590, such as vibration, bending moment, acceleration, oscillations, whirl, stick-slip, weight-on-bit, fluid flow rate, pressure, temperature, rate of penetration, azimuth, tool face, drill bit rotation, etc.

The BHA 590 may include a steering apparatus or tool 558 for steering the drill bit 550 along a desired drilling path. In one aspect, the steering apparatus may include a steering unit 560, having a number of force application members 561a-561n. The force application members may be mounted directly on the drill string, or they may be at least partially integrated into the drilling motor. In another aspect, the force application members may be mounted on a sleeve, which is rotatable about the center axis of the drill string. The force application members may be activated using electro-mechanical, electro-hydraulic or mud-hydraulic actuators. In yet another embodiment the steering apparatus may include a steering unit 558 having a bent sub and a first steering device 558a to orient the bent sub in the wellbore and the second steering device 558b to maintain the bent sub along a selected drilling direction. The steering unit 558, 560 may include near-bit inclinometers and magnetometers.

The drilling system 100 may include sensors, circuitry and processing software and algorithms for providing information about desired drilling parameters relating to the BHA, drill string, the drill bit and downhole equipment such as a drilling motor, steering unit, thrusters, etc. Many current drilling systems, especially for drilling highly deviated and horizontal wellbores, utilize coiled-tubing for conveying the drilling assembly downhole. In such applications a thruster may be deployed in the drill string 520 to provide the required force on the drill bit.

Exemplary sensors for determining drilling parameters include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED.

The drilling system 100 can include one or more downhole processors at a suitable location such as 593 on the BHA 590. The processor(s) can be a microprocessor that uses a computer program implemented on a suitable non-transitory computer-readable medium that enables the processor to perform the control and processing. The non-transitory computer-readable medium may include one or more ROMs, EPROMs, EAROMs, EEPROMs, Flash Memories, RAMs, Hard Drives and/or Optical disks. Other equipment such as power and data buses, power supplies, and the like will be apparent to one skilled in the art. In one embodiment, the MWD system utilizes mud pulse telemetry to communicate data from a downhole location to the surface while drilling operations take place. The surface processor 542 can process the surface measured data, along with the data transmitted from the downhole processor, to evaluate the formation. While a drill string 520 is shown as a conveyance device for tool 500, it should be understood that embodiments of the present disclosure may be used in connection with tools conveyed via rigid (e.g. jointed tubular or coiled tubing) as well as non-rigid (e.g. wireline, slickline, e-line, etc.) conveyance systems. The drilling system 100 may include a bottomhole assembly and/or sensors and equipment for implementation of embodiments of the present disclosure on either a drill string or a wireline.

A point of novelty of the system illustrated in FIG. 11 is that the surface processor 542 and/or the downhole processor 593 are configured to perform certain methods (discussed below) that are not in the prior art. Surface processor 542 or downhole processor 593 may be configured to control steering apparatus 558, mud pump 534, drawworks 530, rotary table 514, downhole motor 555, other components of the BHA 590, or other components of the drilling system 100. Surface processor 542 or downhole processor 593 may be configured to control sensors described above and to estimate a parameter of interest according to methods described herein.

Control of these components may be carried out using one or more models using methods described below. For example, surface processor 542 or downhole processor 593 may be configured to modify drilling operations i) autonomously upon triggering conditions, ii) in response to operator commands, or iii) combinations of these. Such modifications may include changing drilling parameters, steering the drillbit (e.g., geosteering), and so on. Control of these devices, and of the various processes of the drilling system generally, may be carried out in a completely automated fashion or through interaction with personnel via notifications, graphical representations, user interfaces and the like. Reference information accessible to the processor may also be used. In some general embodiments, surface processor 542, downhole processor 593, or other processors (e.g. remote processors) may be configured to operate the TEM tool 500 to induce and measure TEM signals.

Figure 12:
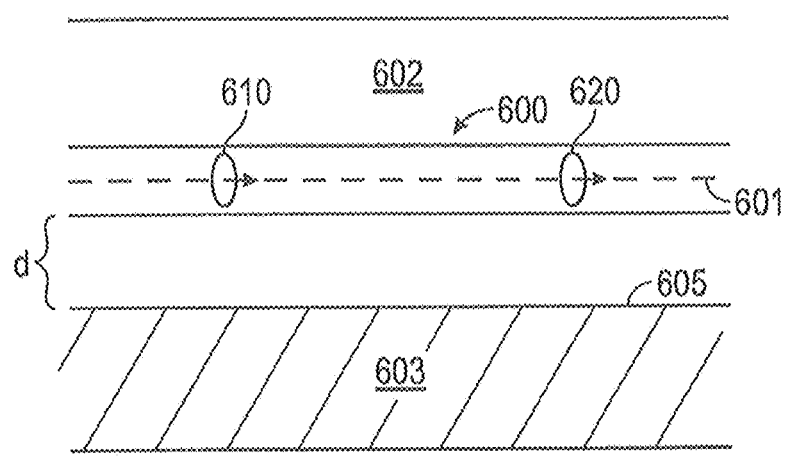
FIG. 12 illustrates a TEM tool in a subterranean environment in accordance with embodiments of the present disclosure.

FIG. 12 illustrates a TEM tool 600 in a subterranean environment in accordance with embodiments of the present disclosure. The tool 600 may include a transmitter 610 and a receiver 620 disposed along drillstring 520. Other embodiments may include additional transmitters or receivers. The transmitter 610 may be configured to induce a time-dependent current in the formation. For example, the transmitter 610 may include an antenna coil coupled with a current source. The receiver 620 may be configured to convert a time-dependent transient electromagnetic signal induced by the formation responsive to the current into an output signal. The tool 600 may be configured to cause the transient electromagnetic signal by abruptly changing a magnetic moment of the transmitter 610. This may be carried out by switching a current on and off in the transmitter coil to generate pulses. The transmitter 610 may include an antenna coil coupled with a current source and a magnetic core having residual magnetization. Switching current in the antenna coil results in magnetization reversal in the magnetic core and change in magnetic dipole moment of the antenna. Some embodiments may include an induction antenna for both transmitting and receiving signals and/or one or more bucking coils or other bucking components.

Many variations in transmitter and receiver configurations may be successfully employed. Transmitters and receivers may vary in number, location (e.g., with respect to the tool, to one another, to the drill bit, and so on) and orientation (e.g., transverse, longitudinal, tilted, etc.). As one example, the techniques of the present disclosure are amenable for use with the 3DEX® tool, such as, for example, in connection with anisotropic formation media.

In operation, tool 600 is configured to effect changes in the transmitter to induce a time-dependent current in the formation. Transient signals occur in the receiver antennas that are induced by the formation responsive to the current. The induced signal contains information about formation characteristics. Thus, the receiver produces a response indicative of formation characteristics, such as the parameter of interest. A processor is configured to measure the time-dependent transient electromagnetic (TEM) signal induced by the formation.

TEM tool 600 lies next to a formation interface 605. Transmitter 610 and receiver 620 lie along a common axis 601 that is horizontally positioned in the upper half-space 602 parallel to the interface and is separated by a distance d from the interface. The term "interface" includes a fluid interface between two different fluids in an earth formation (e.g., a fluid front) as well as a boundary between two different geologic or stratigraphic intervals in the earth (e.g., distance to bed). Examples following use distance to bed for convenience of illustration, but it should be readily apparent that embodiments wherein distance to an interface of a different type is estimated are within the scope of the disclosure. The upper half-space 602 has a resistivity of 50 $\Omega$-m and the remote formation (lower half-space) 603 is shown to have a resistivity of 2 $\Omega$-m. It should be noted that the coaxial transmitter-receiver configuration shown herein is not to be construed as a limitation and any suitable arrangement including but not limited to an arrangement having a transverse transmitter and/or a transverse receiver may be used.

Figure 13A:
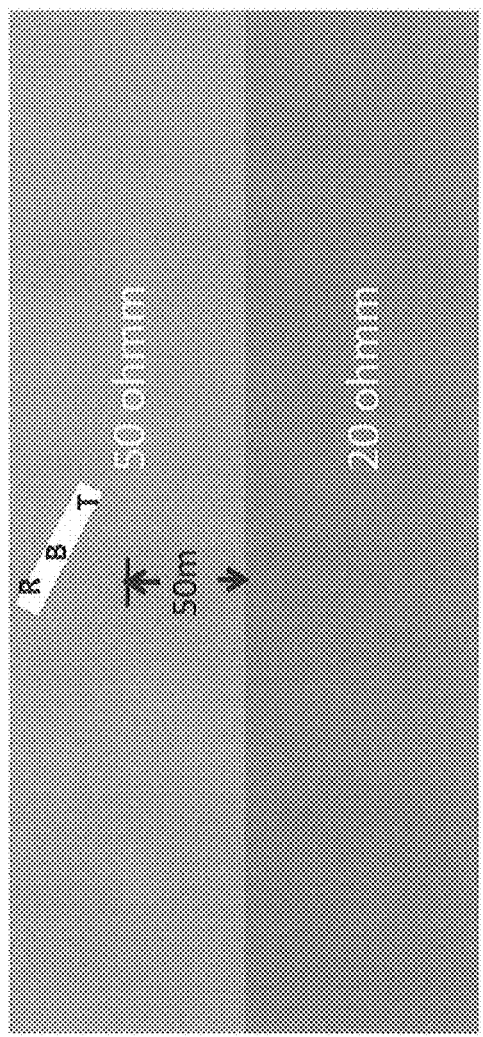
FIG. 13A illustrates an example tool configuration with respect to an earth formation in accordance with embodiments of the present disclosure.
Figure 13B:
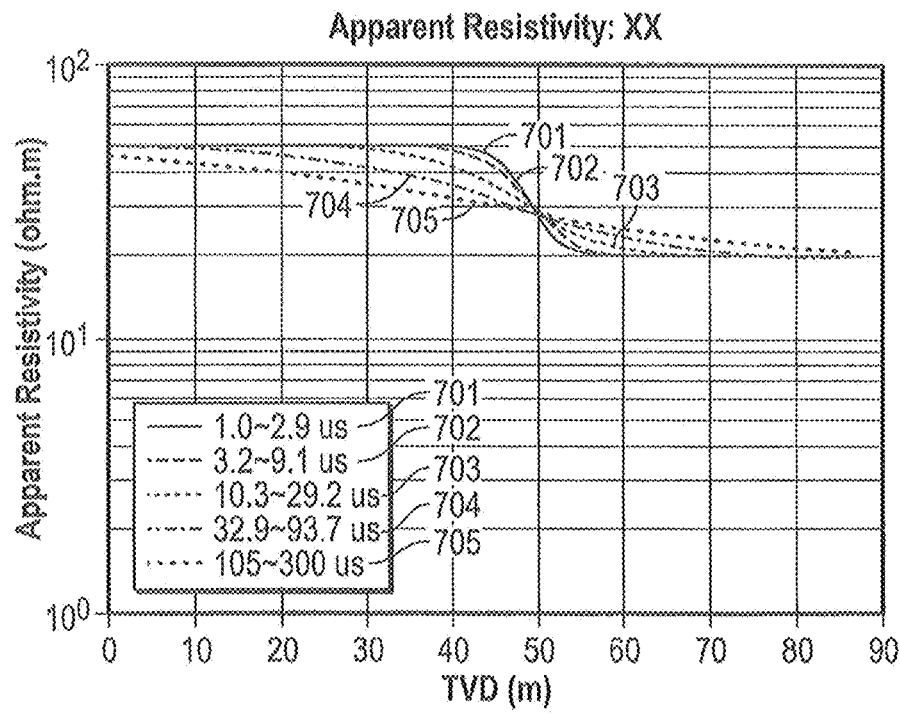
FIG. 13B illustrates an apparent resistivity log for the XX component in accordance with embodiments of the present disclosure.
Figure 13C:
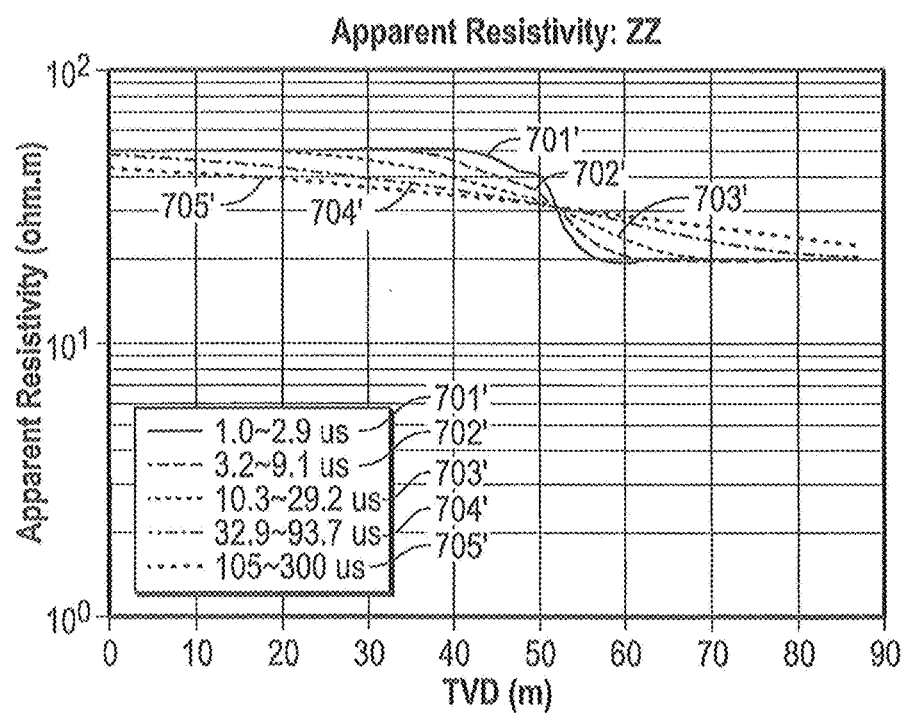
FIG. 13C illustrates an apparent resistivity log for the ZZ component in accordance with embodiments of the present disclosure.

FIG. 13A illustrates an example tool configuration with respect to an earth formation in accordance with embodiments of the present disclosure. FIG. 13B illustrates an apparent resistivity log for the XX component in accordance with embodiments of the present disclosure. FIG. 13C illustrates an apparent resistivity log for the ZZ component in accordance with embodiments of the present disclosure. Generation of the AR logs of FIGS. 13B-13C are consistent with the procedure described above, which takes the synthetic TEM responses and converts to several AR values at each logging depth, and are displayed in the new format.

In this particular case N=50, n=5, and the time range is [1, 300] µs, divided into 5 time windows as illustrated in the plots. The benchmark model is the same as in FIGS. 10A-10C. It is readily apparent that FIG. 13B is free of artifacts, indicating that the new method removes ambiguity in AR determination and is much more robust and reliable than the previous method.

The AR logs of FIGS. 13B and 13C are useful tools which provide valuable petrophysical information about the formation. At zero TVD all five AR values are almost collocated at 50 ohm-m indicating the tool "sees" (e.g. experiences or senses) a homogeneous 50 ohm-m formation. As logging proceeds, the curves 701-705 (and 701'-705', respectively) demonstrate decreasing AR with increasing time/DOI, which indicates a conductive boundary approaching. Curve 701 responds latest (but most abruptly) to the boundary as the tool crosses the boundary at TVD=50 m, which could be used as a boundary-crossing indicator. Eventually all curves again read the same at 20 ohm-m showing that the tool now sees itself in a homogeneous 20 ohm-m formation.

If the thickness, dip angle and the resistivity of each layer is predetermined (e.g. from pilot wells or other wells in the same field), the AR curves can be used as a boundary detector. Visually, it is easy to determine that AR curve 705 starts to see the boundary at least 30 meters away with the AR reading close to 40 ohm-m, while the other curves still read around 50 ohm-m. It should give a very early warning of approaching conductive layer for the drilling engineer to respond accordingly. A one-parameter inversion can be developed based on the AR curves for the exact value of the distance to bed.

Figure 14A:
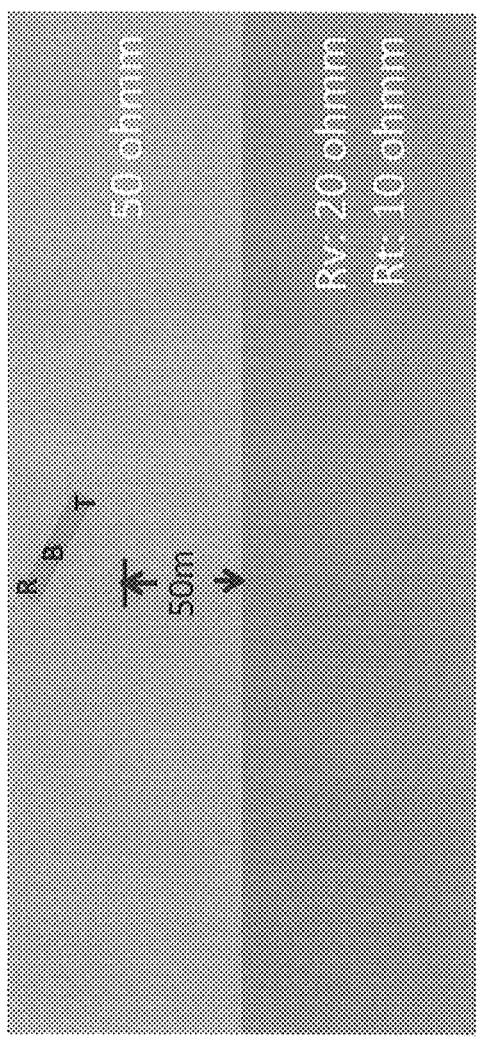
FIGS. 14A-14C show the example of a two-layer formation model in accordance with embodiments of the present disclosure.
Figure 14B:
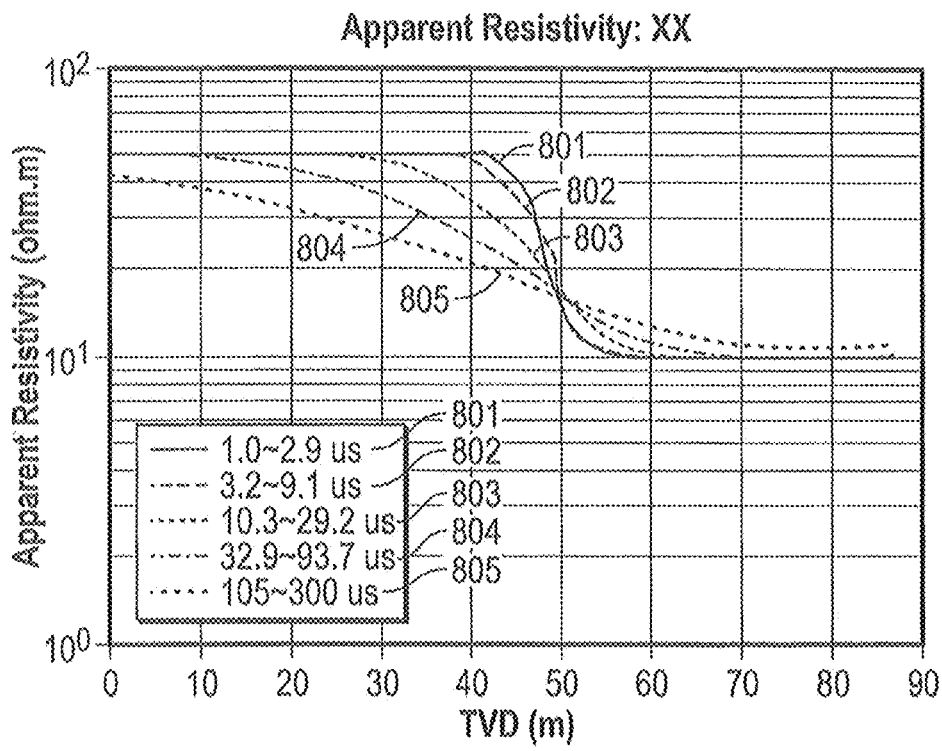
Figure 14C:
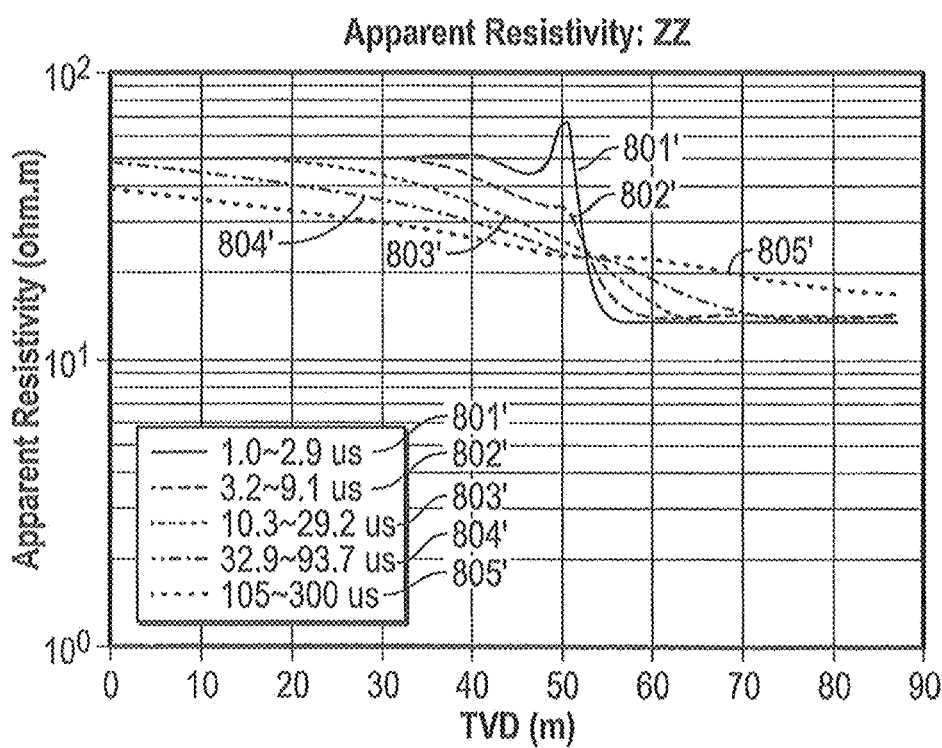

The XX and ZZ AR logs may also be used together as an anisotropy indicator. FIGS. 14A-14C show the example of a two-layer formation model. The top layer is isotropic with resistivity 50 ohm-m. The bottom layer is anisotropic, with vertical and horizontal resistivity 20 ohm-m and 10 ohm-m, respectively. When the tool logs through the first layer (TVD<50 m), the shallower curves for both XX and ZZ components read near 50 ohm-m, which indicates the top layer is isotropic. After the tool enters the second layer, the shallower AR curves for XX read around 10 ohm-m while for ZZ the value is close to 14 ohm-m. This indicates the second layer is anisotropic, with a vertical resistivity greater than horizontal resistivity based on the high relative angle of the tool to the bed. Thus, AR curves may be used for identification and qualitative analysis of the anisotropy effect. The exact value of anisotropy can be obtained through inversion.

Figure 15A:
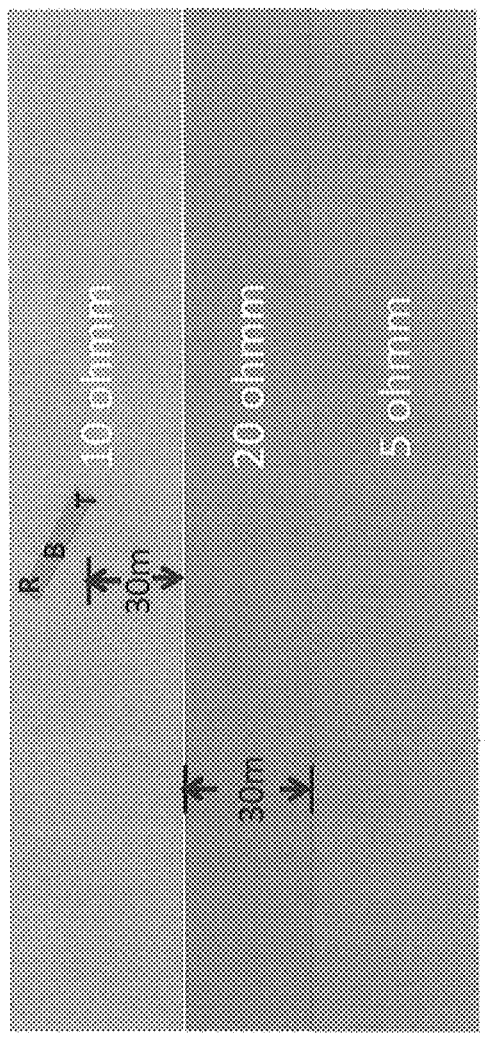
FIGS. 15A-15C show the example for a three-layer model in accordance with embodiments of the present disclosure.
Figure 15B:
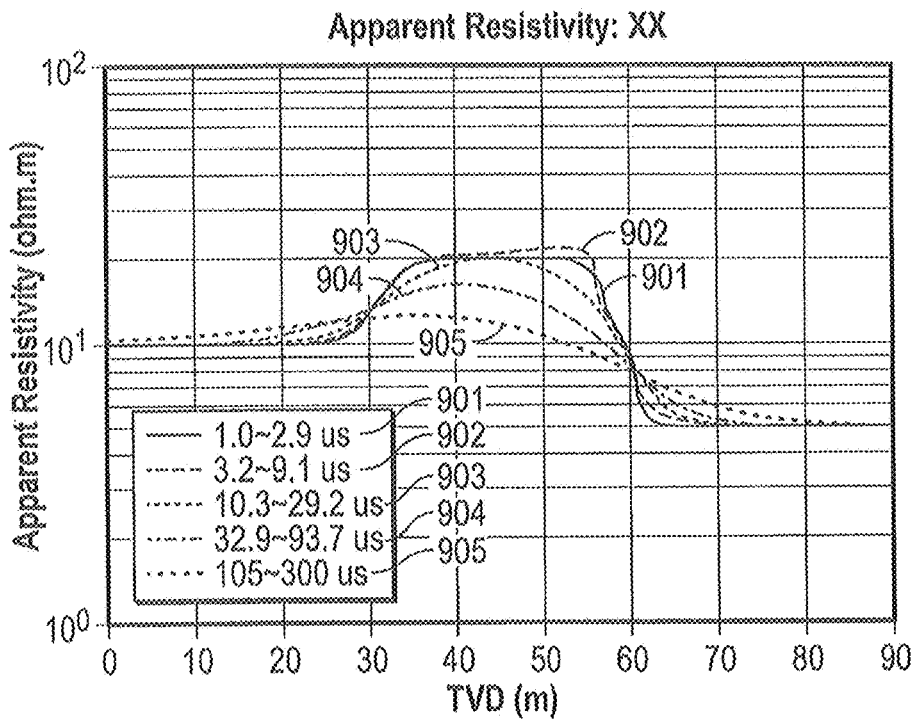
Figure 15C:
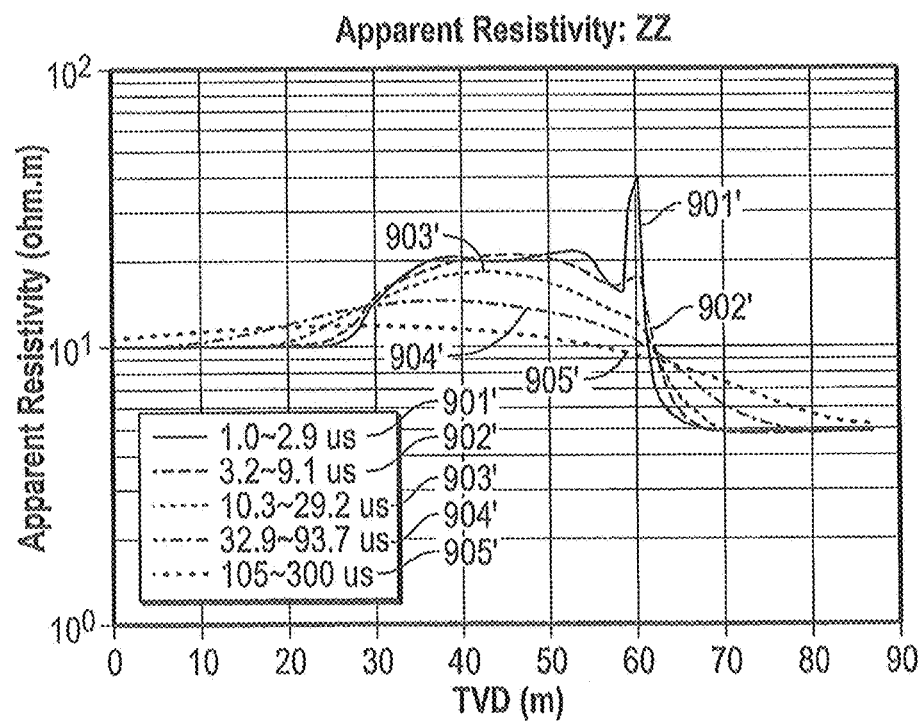

FIGS. 15A-15C show the example for a three-layer model, where the resistivity for each layer is 10 ohm-m, 20 ohm-m, and 5 ohm-m, respectively. The tool starts 30 meters above the first boundary and the thickness of the second layer is 30 meters. The dip angle maintains at 85 degrees as the tool logs across all three layers. The shallower AR curves are able to correctly indicate the resistivity values and the boundary positions for each layer. The deepest curve shows an averaged AR response indicating that the diameter of detection of the latest TEM signal is greater than the thickness of the second layer.

Embodiments of the disclosure include using the corresponding apparent resistivity values to estimate a corresponding distance from the device (e.g., tool 600) to the interface. This estimation may be carried out by estimating a diffusion time corresponding to the apparent resistivity values and calculating a diffusion distance corresponding to the diffusion time in a homogeneous formation. Here and after the term "diffusion" should be understood only in a sense that in a quasi-stationary approximation (which may be the present case) the EM fields are governed by a second order differential equation that has exactly the form of diffusion equation. For example, curve separation may be used to estimate the diffusion time.

An example is provided for illustration using the embodiment described above with reference to FIGS. 17A-17C. For each logging depth, five AR values AR[1 ... 5] are estimated for each of the five samples corresponding to five discrete time windows of the TEM measurement (T[1 ... 5]) In this example, $$T[1 \ldots 5] = [1.0, 3.2, 10.3, 32.9, 105],$$

wherein the values are in microseconds.

A processor is used to interpolate between T[1] and T[5] to increase the number of data points. In this case, the interpolation may generate forty AR values ($AR_{int}[1 \ldots 40]$) corresponding to forty time values ($T_{int}[1 \ldots 40]$) A minimum index i is determined such that $$100 \times \left| \frac{AR_{int}[i] - AR_{int}[1]}{AR_{int}[1]} \right| > \beta,$$

wherein β is a curve deviation threshold, in percent (e.g., 3-5 percent). The distance (d) to the interface may then be determined according to $$\alpha \times \sqrt{\frac{2 T_{int}[i] \times 10^{-6} \times AR_{int}[1]}{4\pi \times 10^{-7}}}$$

wherein α is a distance scaling factor, 0<α<1 (e.g., 0.8-0.9). A log of the corresponding distance to interface as a function of borehole depth may be generated and displayed.

Figure 16A:
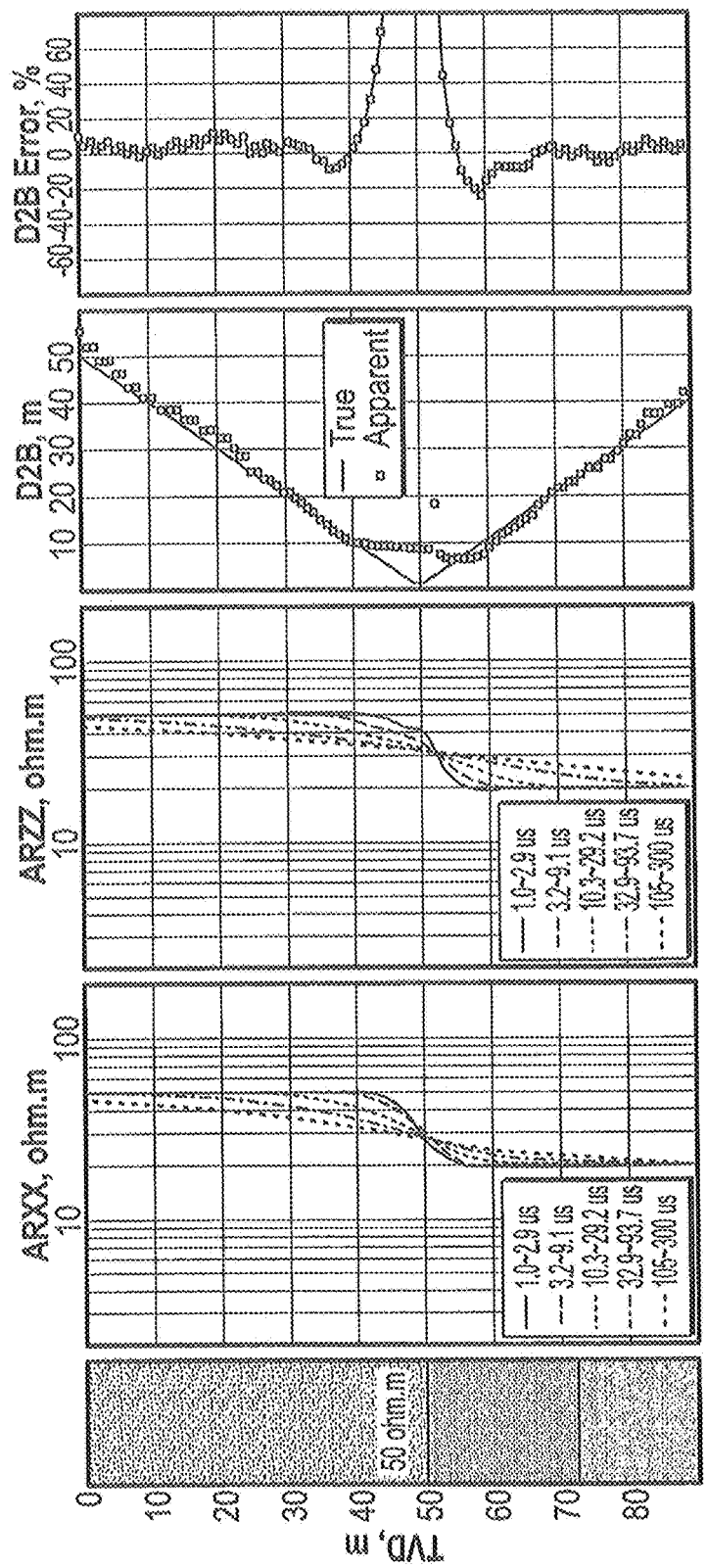
FIGS. 16A-16C illustrate an example display of the apparent resistivity log with an estimated distance-to-bed log and a distance-to-bed projected error log.
Figure 16B:
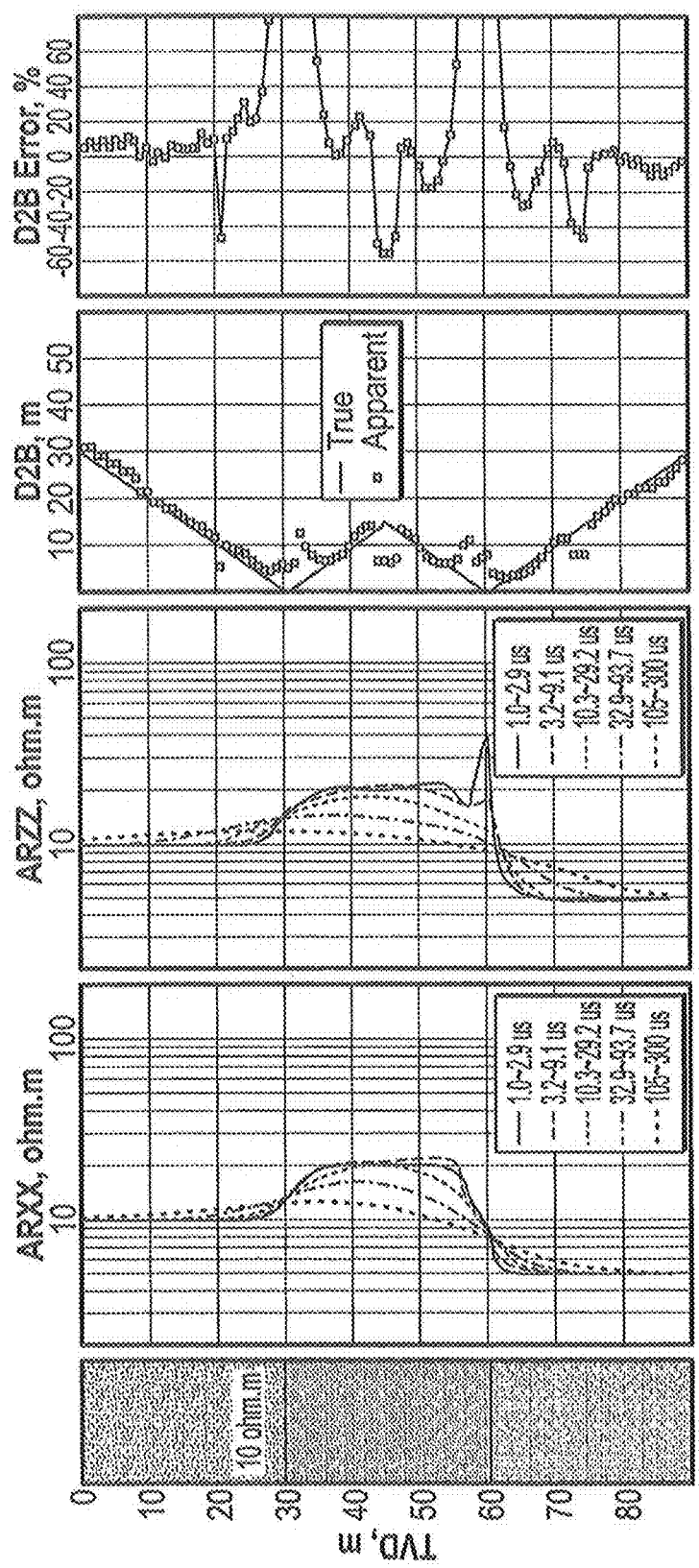
Figure 16C:
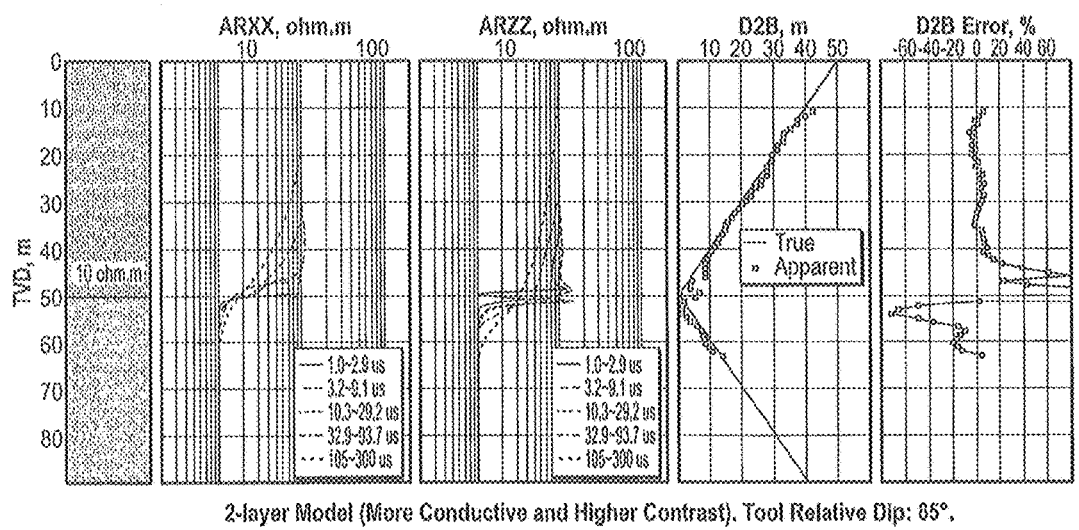

FIGS. 16A-16C illustrate an example display of the apparent resistivity log with an estimated distance-to-bed log and a distance-to-bed projected error log. FIG. 16A shows logs consistent with a two-layer model as described with respect to FIGS. 13A-13C. FIG. 16B shows logs consistent with a three-layer model as described with respect to FIGS. 15A-15C. FIG. 16C shows logs consistent with a high contrast (conductive) two-layer model.

One way of characterizing an earth formation is by using gravity measurements to estimate hydrocarbon or other fluid movement. Time-lapse reservoir monitoring may be one application for embodiments of the present disclosure. Hydrocarbons in earth formations, such as reservoirs, are subject to the migration of fluids (oil, water, gas, etc.) over time. Detecting, measuring, and mapping the movement of these fluids may be useful for estimating the producible hydrocarbon content of an earth formation and improving hydrocarbon recovery. The hydrocarbon movement may also be used to estimate the rate of depletion of a reservoir.

Embodiments of the present disclosure may be applied in monitoring fluid fronts. One situation where a fluid front may arise is in secondary and enhanced recovery operations where a fluid such as water is injected into the formation from an injection well spaced apart from the well. Methods may further include conducting secondary and enhanced recovery operations in dependence upon information relating to the fluid front.

The presence of conductive water in a formation that includes nonconductive hydrocarbons produces a resistivity contrast that can be located using TEM tool 600. The tool may be a wireline tool, which may be deployed in a well, called a monitor well. Using the tool 600 allows the location of the fluid front to be identified, which facilitates control of secondary recovery operations. In other embodiments the tool may be permanently deployed in a borehole. The permanent deployment may be in a production well.

Figure 17:
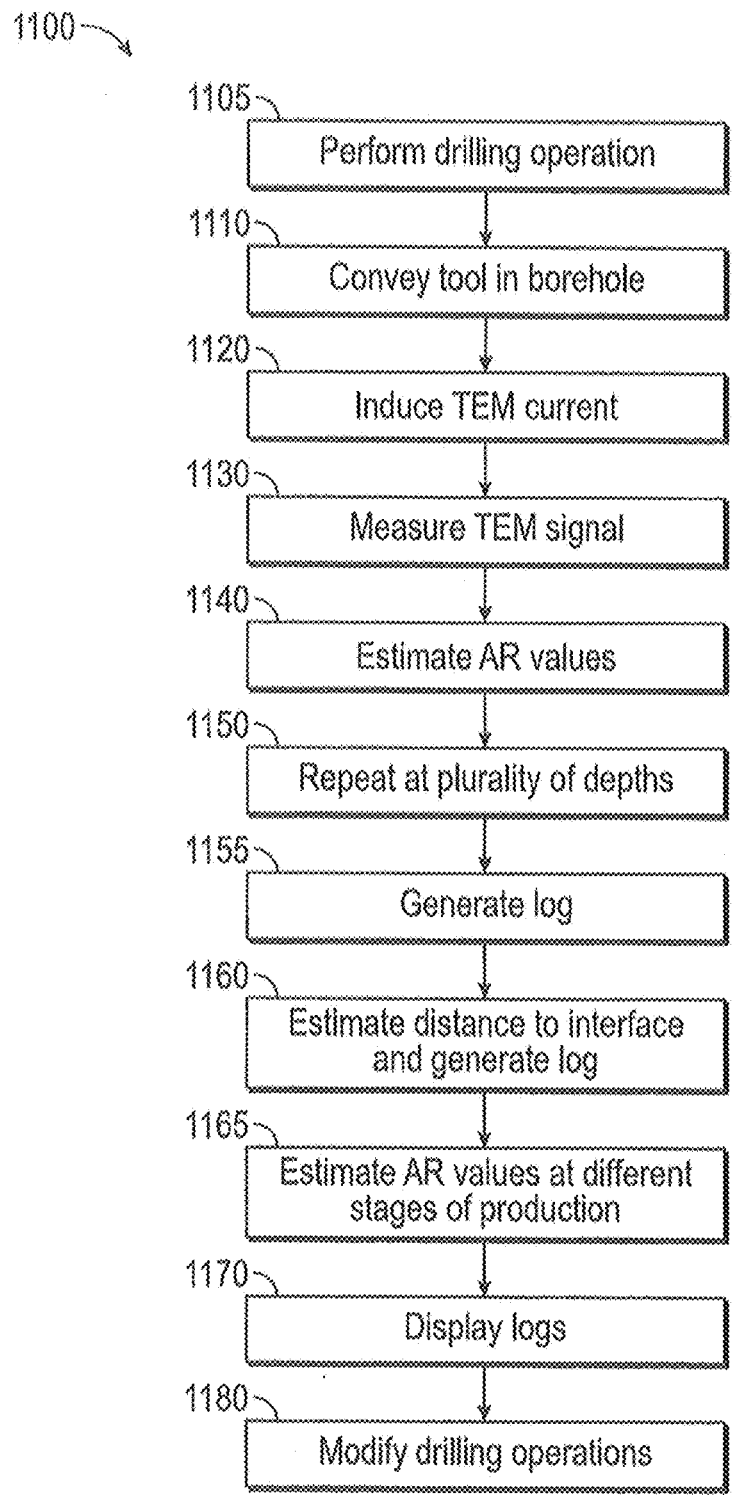
FIG. 17 illustrates a method for estimating a parameter of interest in accordance with embodiments of the present disclosure.

FIG. 17 illustrates a method for estimating a parameter of interest in accordance with embodiments of the present disclosure. Optional step 1105 of the method 1100 may include performing a drilling operation in a borehole. For example, a drill string may be used to form (e.g., drill) the borehole. Optional step 1110 may include conveying a TEM tool 600 in the borehole on a conveyance device.

Step 1120 of the method 1100 includes inducing a time-dependent current in the formation. This may be carried out by abruptly changing a magnetic moment of a transmitter in the borehole. Step 1130 of the method 1100 includes measuring a time-dependent transient electromagnetic (TEM) signal induced by the formation responsive to the current, which produces a TEM measurement. The signal may be generated in the receiver (or indicative of the signal generated in the receiver) and caused by the formation responsive to the current.

Step 1140 of the method 1100 includes estimating apparent resistivity values for each of a plurality of samples derived from the TEM measurement. Step 1140 may include generating the plurality of samples by dividing the TEM measurement into a plurality of corresponding intervals. Each sample may correspond to a discrete time window of the TEM measurement. Estimating the apparent resistivity values for each of the plurality of samples may include determining for each sample a simulated homogeneous formation that provides a best fit for the sample. Step 1140 may be carried out while conducting drilling operations in the borehole and may be carried out in near real-time.

Optionally, at step 1140, the method may be carried out by identifying, from a plurality of simulated homogeneous formations, the simulated homogeneous formation having synthetic responses that provide the best fit for the sample. Any suitable curve-fitting technique may be utilized, including, but not limited to, the techniques that utilize least square fit (linear or non-linear), exponential functions, and so on. The synthetic responses may be determined using the respective simulated homogeneous formation and known parameters for the tool. As one option, step 1140 may further be carried out by storing the synthetic responses for each of a plurality of simulated homogeneous formations. The synthetic responses may be pre-calculated using the respective simulated homogeneous formation and known parameters for the tool. For example, a processor may use a look-up table to map responses to identify the simulated homogeneous formation. As another option, step 1140 may include determining in near real-time synthetic responses for each of a plurality of simulated homogeneous formations using the respective simulated homogeneous formation and known parameters for the tool. This may be carried out algorithmically and/or iteratively. Known parameters of the tool may include at least one of: i) a transmitter moment; and ii) receiver moment; and iii) tool dimensions. Step 1140 may also include using a least squares minimization technique.

Optional step 1150 may include repeating steps 1120-1140 to estimate corresponding apparent resistivity values estimated from TEM measurements for a plurality of borehole depths. Optional step 1155 may include generating a log of the corresponding apparent resistivity values as a function of borehole depth. Optional step 1160 may include using the corresponding apparent resistivity values to estimate a corresponding distance to an interface for the plurality of borehole depths; and generating a log of the distance to the interface as a function of depth. Optional step 1165 may include repeating steps 1120-1140 to estimate corresponding apparent resistivity values estimated from TEM measurements at different stages in the production or injection cycle. Optional step 1165 may include may include generating a log of the corresponding apparent resistivity values as a function of the stage of the hydrocarbon recovery operation (e.g., number of days into the recovery operation) for monitoring reservoir fluids. Step 1165 may include using the corresponding apparent resistivity values to estimate a corresponding distance to fluid fronts for the plurality of hydrocarbon recovery stages and generating a log of the distance to fluid fronts as a function of the stage in the hydrocarbon recovery operation. Optional step 1170 may include displaying any of the apparent resistivity logs and the distance-to-interface logs above. The display facilitates visualization of formation resistivity variations. Optional step 1180 may include modifying drilling operations in the borehole dependent upon the estimated apparent resistivity values.

Mathematical models, look-up tables, neural networks, or other models representing relationships between the parameter(s) of interest and apparent resistivity values may be used to characterize the drilling operation, optimize one or more drilling parameters of a drilling operation, change direction of drilling, or otherwise modify drilling operations in the borehole. The system may carry out these actions through notifications, advice, and/or intelligent control.

The term "conveyance device" or "carrier" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, and self-propelled tractors.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, a processor includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

Thus, configuration of the processor may include operative connection with resident memory and peripherals for executing programmed instructions. In some embodiments, estimation of the parameter of interest may involve applying a model. The model may include, but is not limited to, (i) a mathematical equation, (ii) an algorithm, (iii) a database of associated parameters, or a combination thereof.

The term "near real-time" as applied to methods of the present disclosure refers to an action performed while the BHA is still downhole and prior to the drill bit extending the borehole a distance of 1 meter, 0.5 meters, 0.25 meters, 0.1 meters, or less; and may be defined as estimation of the parameter of interest within 15 minutes of measurement, within 10 minutes of measurement, within 5 minutes of measurement, within 3 minutes of measurement, within 2 minutes of measurement, within 1 minute of measurement, or less.

The term "predominantly" relates to an amount of current induced in a depth of investigation in the earth formation relative to an amount of current induced in another depth in the earth formation. A predominantly greater amount of current induced in the depth of interest will provide a response of electromagnetic energy that can be related to a property of the earth formation at the depth of investigation. As used herein, the term "predominantly" relates at least to a minimum amount of increase in currents induced at the depth of investigation with respect to other depths, the minimum amount being necessary to be able to estimate a property of the earth formation at the depth of investigation from the response.

While the present disclosure is discussed in the context of a hydrocarbon producing well, it should be understood that the present disclosure may be used in any borehole environment (e.g., a water or geothermal well).

Next, the IB method and associated apparatus are discussed in detail. Resistivity information about a formation may be helpful in ascertaining characteristics of the formation and making decisions based on the formation. Resistivity values may be estimated, rather than measured directly, based on induced (reflected) electrical pulses resulting from transmitting current pulses (excitation pulses) into the formation. Prior inversion algorithms used to estimate formation parameters from data acquired in this manner only account for step-function excitation pulses. In addition, the methods may rely on heuristic relationships between parameters that are not always valid under every circumstance. Embodiments of the system and method discussed herein relate to an inversion algorithm that employs look-up tables to provide inversion results in accordance with the IB technique.

Generally, inversion is a process of finding a model that provides the best fit between measured data and synthetic data. With respect to geophysical data, inversion facilitates inferring information about a formation from acquired data. The inference is usually statistical and generally not uniquely solvable. That is, when a single model fits the data, then an infinite number of models would fit the data, as well. Many of those models may, in fact, be unreasonable or yield inferences that are inaccurate. Embodiments of the system and method discussed herein include the use of prior information to reject the unreasonable models that fit the data.

Figure 18:
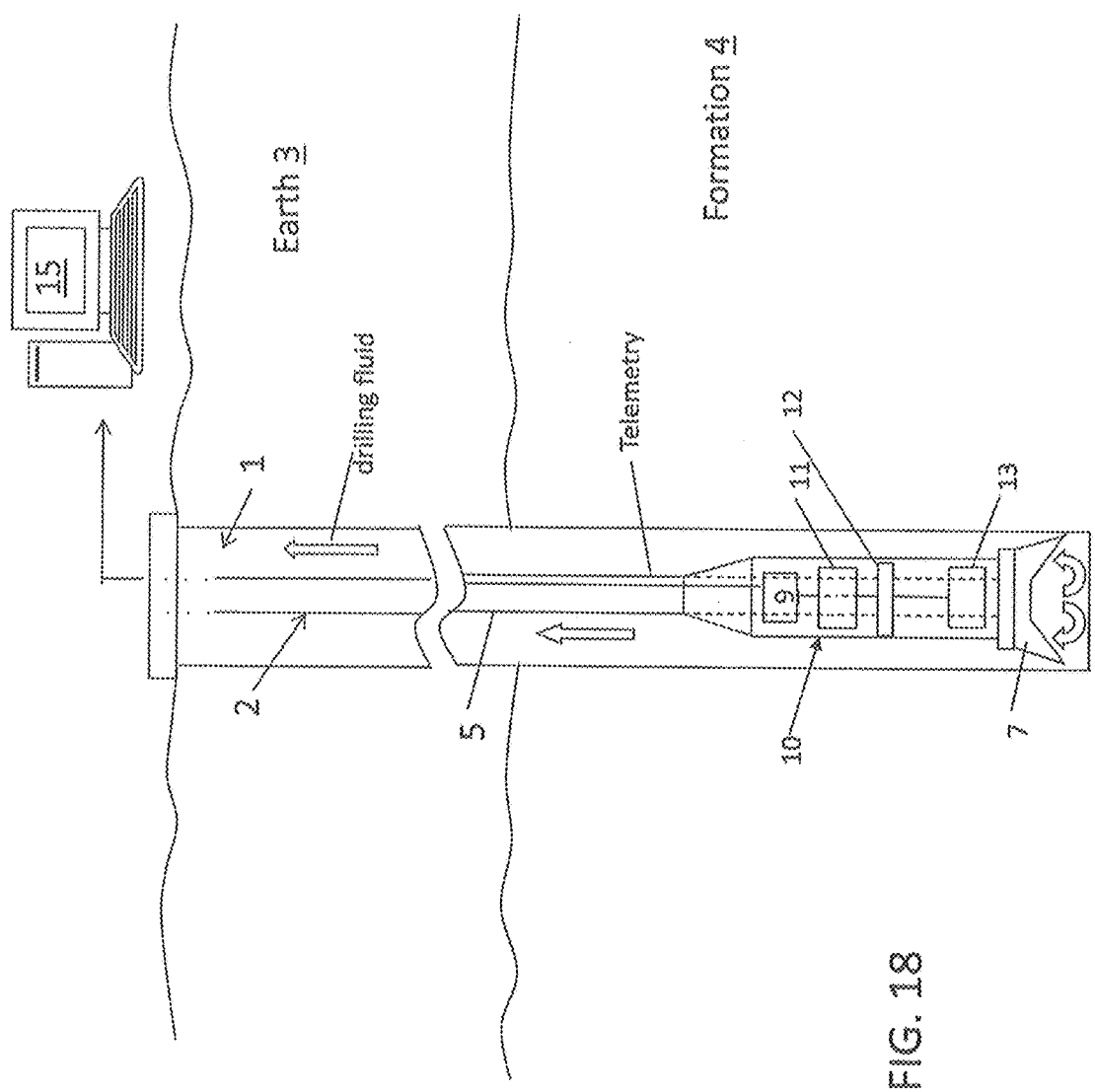
FIG. 18 is a cross-sectional view of an exemplary system to estimate the electrical properties of a formation.

FIG. 18 is a cross-sectional view of an exemplary system to estimate the electrical properties of a formation. While the system may operate in any subsurface environment, FIG. 18 shows a downhole tool 10 disposed in a borehole 2 penetrating the earth 3, which includes an earth formation 4. The downhole tool 10 may include a number of measurement devices to perform one or more types of measurements and is conveyed through the borehole 2 by a carrier 5. In the embodiment of FIG. 18, the carrier 5 is a drill string 6 in an embodiment known as Measure While Drilling (MWD). Disposed at a distal end of the drill string 6 is a drill bit 7. A drilling rig (not shown) may be disposed at the surface to conduct drilling operations and to pump drilling fluid through the drill string 6 and thus the drill bit 7 in order to lubricate the drill bit 7 and flush cuttings from the borehole 2. In alternate embodiments, the carrier 5 is an armored wireline used in wireline logging after drilling has ceased. Downhole electronics 9 may be configured to operate and/or process the information obtained by one of more of the measurement devices of the downhole tool 10 and interface with telemetry (e.g., mud pulse telemetry) to communicate data to the computer processing system 15 at the surface. The computer processing system 15 includes one or more processors, one or more memory devices, and input and output devices. The downhole electronics may include at least some of the components of the computer processing system 15 to process data downhole. The downhole tool 10 may include, for example, a density tool 12 and a spectroscopy tool 13. The downhole tool 10 also includes an induction tool 11 to transmit current pulses into the formation 4 and receive resultant induced pulses. The induction tool 11 may be comprised of separate housings for the transmitter and receiver portions. The inversion of the received induced pulses to determine formation resistivity and other parameters is discussed below.

Figure 19:
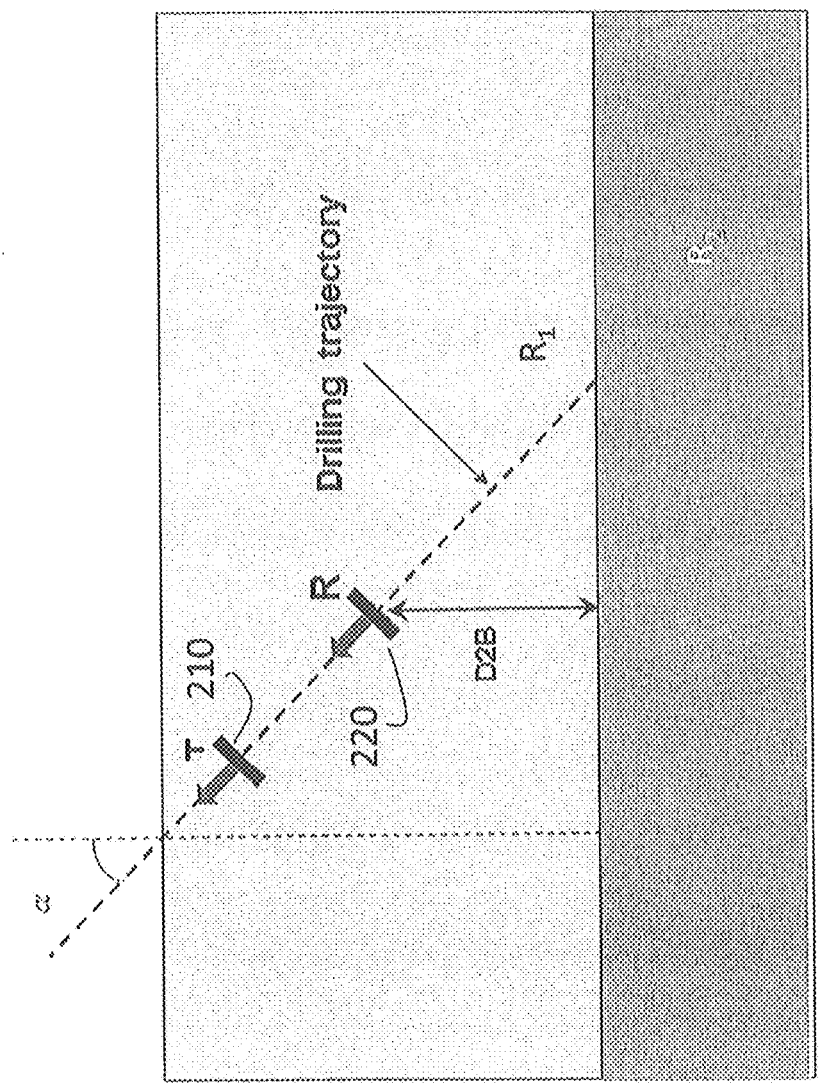
FIG. 19 illustrates an exemplary drilling trajectory for which the induction tool 11 is processed according to an embodiment of the invention.

FIG. 19 illustrates an exemplary drilling trajectory for which the induction tool 11 is processed according to an embodiment of the invention. Initially, models are defined that satisfy two primary applications: inferring characteristics ahead of the drill bit 7 and geo-steering. In the case of looking ahead of the drill bit 7, resistivity around the tool 10 (R1) and resistivity (R2) and distance (D2B) of the formation 4 ahead of the drill bit 7 are of interest. As shown in FIG. 19, the angle, $\alpha$, is the inclination of the drilling trajectory with respect to the approaching layer. In order to parameterize the system, each parameter must have a defined range. In the exemplary case associated with FIG. 19, R1 and R2 resistivity values range between 0.5 and 200 ohms, and the inclination ($\alpha$) ranges from 0 to 90 degrees. To parameterize the distance (D2B), which is tool-specific, prior knowledge about the tool 10 depth of investigation is required. An exemplary maximum depth of investigation of 50 meters and a 1 meter minimal value are assumed for illustrative purposes. In the exemplary case, 20 nodes are used to discretize each parameter in the specified intervals (20 values within the specified range for each parameter). The transmitter 210 and the receiver 220 of the induction tool 11 (FIG. 19) are separated by 5 meters.

Figure 20:
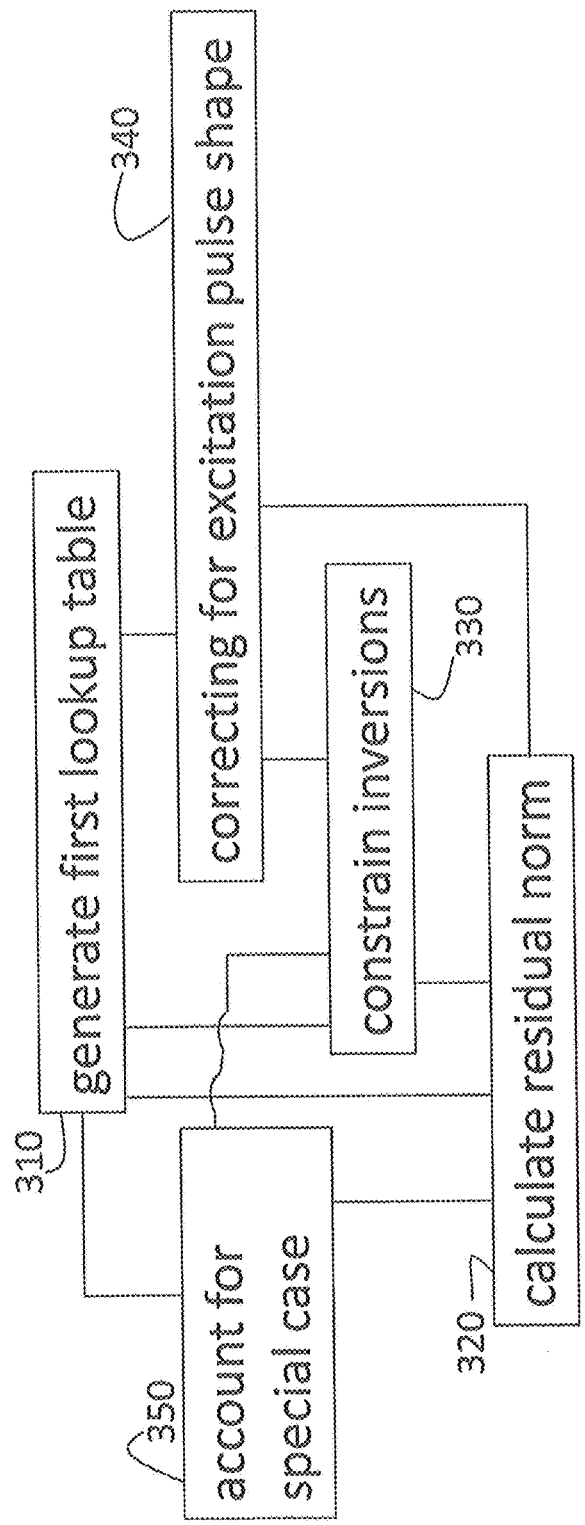
FIG. 20 is a process flow of a method of performing inversion to estimate electrical characteristics from an induced pulse according to embodiments of the invention.

FIG. 20 is a process flow of a method of performing inversion to estimate characteristics of a formation from an induced pulse according to embodiments of the invention. The method is described with reference to the exemplary parameters discussed above with reference to FIG. 19. The method of performing inversion involves performing best fit using at least one lookup table as detailed below. The lookup table may be stored by the one or more memory devices of the computer processing system 15 while the one or more processors of the computer processing system 15 perform the best fit. The discussion with reference to FIGS. 20-25 refers to one lookup table, but it should be understood that one look up table is generated for the parameters of interest corresponding to each axial component of interest. At block 310, generating the first lookup table (referred to here as the original lookup table) may be the most time-consuming operation. In order to generate the original lookup table of synthetic responses corresponding with the discretized above-described characteristics, 160,000 (or 20^4, due to the 4 parameters) forward modeling runs are needed. Assuming a step-function excitation current pulse and a duration of 1 second for each run, generation of the original lookup table (corresponding to a step-function excitation) would require 44 hours (160000/60/60/24) using a 2 giga Hertz (GHz) processor. For a depth of investigation below 50 meters (the assumed maximum for the example), a geometric time step in the time interval from 1 microsecond ($\mu$s) to 10 milliseconds (ms) (100 points) may be advisable. The original lookup table need only be generated once for a given transmitter 210 and receiver 220 spacing and orientation.

The method includes calculating residual norm at block 320. When measured data (e.g., induced pulse) is obtained, the obtained data and original lookup table data are compared to determine a best fit. Specifically, a residual norm $\lambda$ in each node (of the 20 exemplary nodes) of each of the exemplary four-dimensional parameters (R1, R2, $\alpha$, and D2B) is calculated and the parameters corresponding to the node for which reaches a minimum value (best fit) are selected. The residual norm is calculated as:

$$\lambda = \frac{1}{NT} \sum_{J=1}^{NT} \left( \frac{S_E^j - S_0^j}{S_E^j} \right)^2 \qquad [EQ\ 1]$$

where $S_E^j$ is the real data, $S_0^j$ is the synthetic data, and NT is the number of time readings in the measurements.

Figure 21:
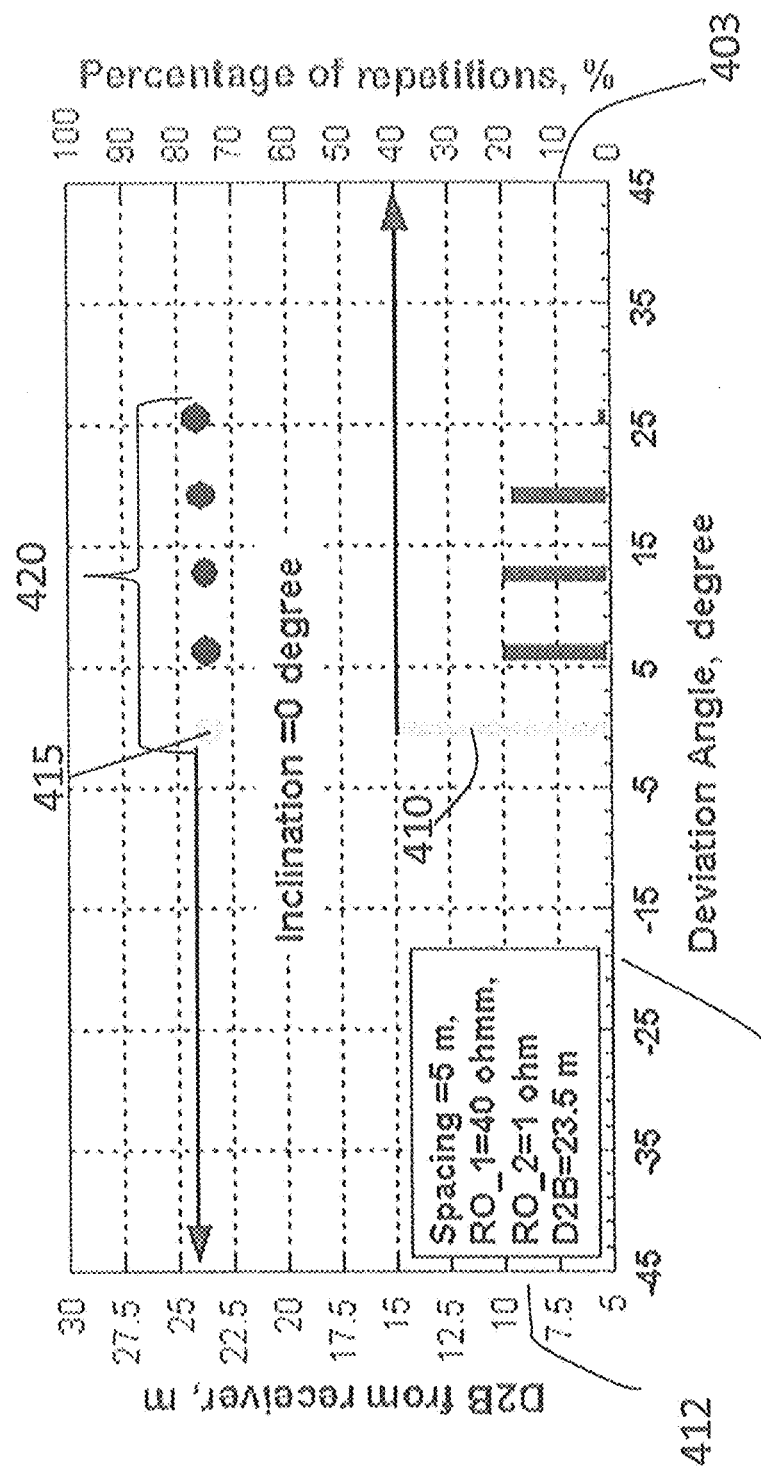
FIGS. 21-23 show results of a statistical inversion according to embodiments of the invention.
Figure 22:
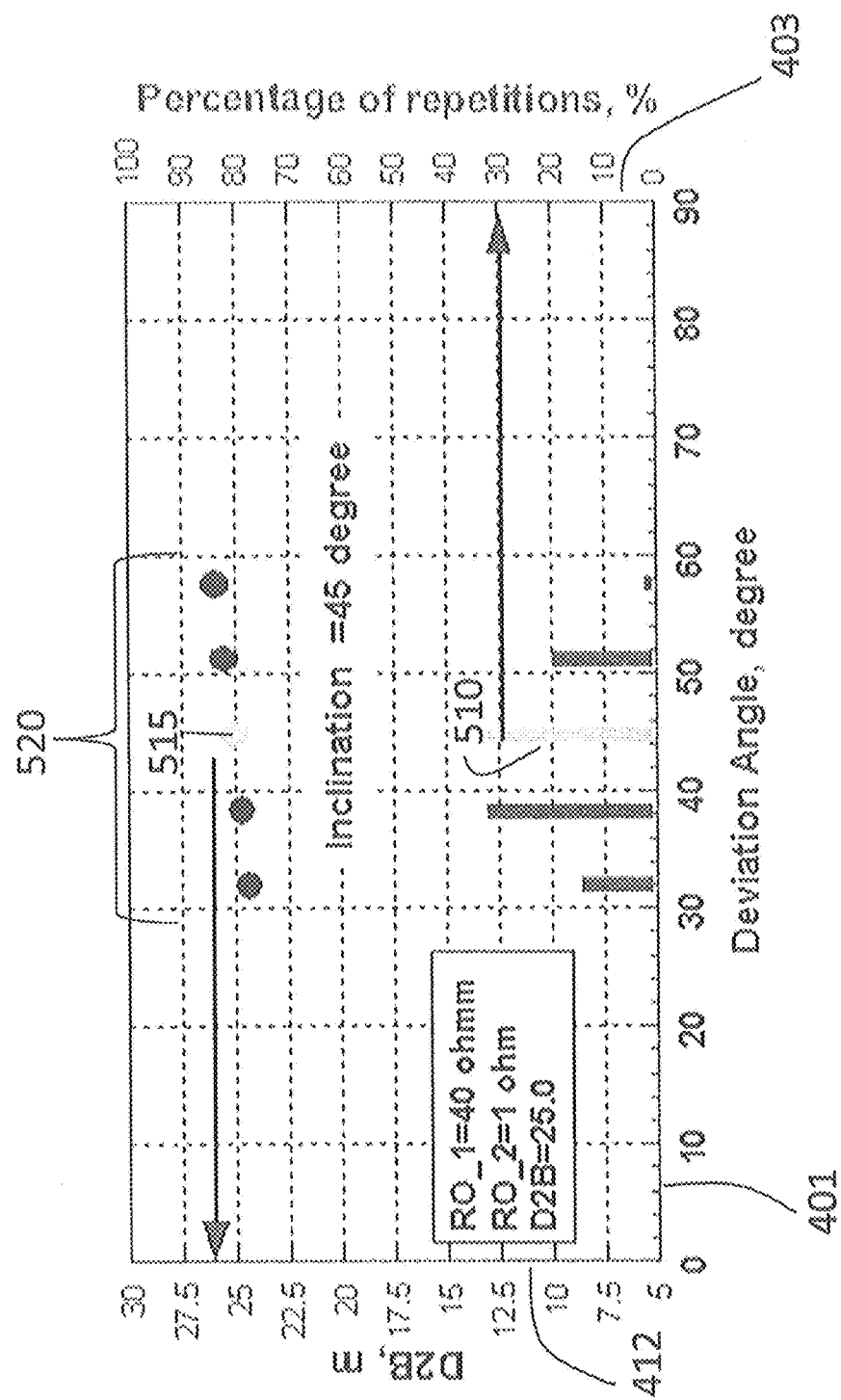
Figure 23:
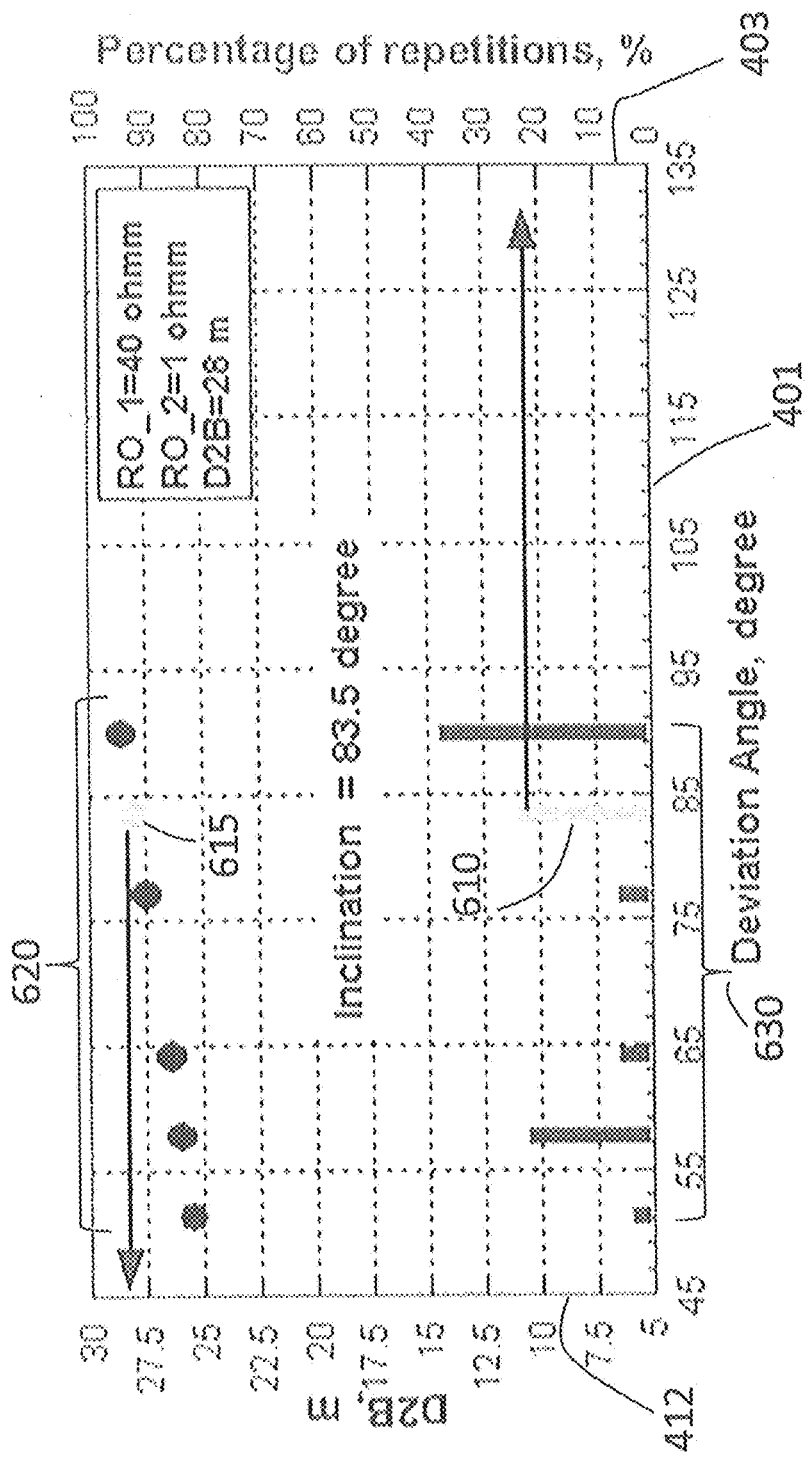

FIGS. 21-23 show results of a statistical inversion according to embodiments of the invention. Each of the three illustrated inversion examples involves 100 runs and a step-function excitation current pulse. That is, the exemplary figures indicate the D2B and inclination angle, α, that provide the minimum residual norm (λ) for each run. Each run is contaminated with a different corresponding noise realization but the same standard deviation. This statistical inversion facilitates an evaluation of both accuracy and robustness of the inversion algorithm. Although ideally the different inversions runs would yield the same results, this is not the case in reality because of a limited number of measurements, the presence of noise, and the discrete nature of the synthetic data used in the inversion. The examples involve the arrangement shown in FIG. 16 with a distance of 5 meters between the transmitter 210 and the receiver 220. That is, simulated input data (measurements of transient electromagnetic data obtained by transmitting an excitation current pulse) for the inversion is generated using the model shown in FIG. 18.

In a first example, the distance to the boundary from the receiver (D2B) is 23.5 meters, R1 is 40 ohm, R2 is 1 ohm, and the angle of inclination, α, is 0 degrees. The noise is 20%. FIG. 21 shows the angle of inclination, α, resulting from the inversion on the x-axis (401). The left y-axis (412) shows the distance to the boundary from the receiver (D2B), and the right y-axis (403) shows the percentage of the 100 inversions runs that provided the same result. That is, each bar (e.g., 410) indicates the deviation angle (at the x-axis 401) and the percentage of the inversions that resulted in that same deviation angle (at the y-axis 403). The exact angle of inclination, α, of 0 degrees was determined in approximately 40% of the runs (as indicated by 410). The exact distance (D2B) of 23.5 meters was determined by 40% of the runs, as well, but all the D2B values obtained through the 100 inversion runs (indicated by 420) are within an error of 5%. The inversion results for the other two parameters of the exemplary four parameters (R1 and R2) are not presented in the examples discussed herein.

In the next example, the distance to the boundary from the receiver (D2B) is 25 meters, R1 is 40 ohm, R2 is 1 ohm, and the angle of inclination, α, is 0 degrees. The noise is 20%. FIG. 21 indicates that the exact angle of inclination, α, of 9 degrees was determined in approximately 30% of the runs (as indicated by 510). The exact distance (D2B) of 25 meters (indicated by 515), was determined by less than a 5% error by all the runs (indicated by 520). In the third example, the inclination angle, α, was changed to 83 degrees. FIG. 22 indicates that, the exact angle of inclination, α, was found by just over 20% of the runs (as indicated by 610). Also, with the increased inclination angle, α, the spread in the angle of inclination a found by the 100 inversion runs (as indicated by 630) is almost 40%. The spread in the D2B values (as indicated by 620) is also increased and the error in determining the correct D2B (indicated by 615) is 10%. These results discussed above, which are obtained by using the entire look up table, are contrasted below with constrained inversion, which reduces the uncertainties and uses only a subset of the lookup table for the inversion.

Figure 24:
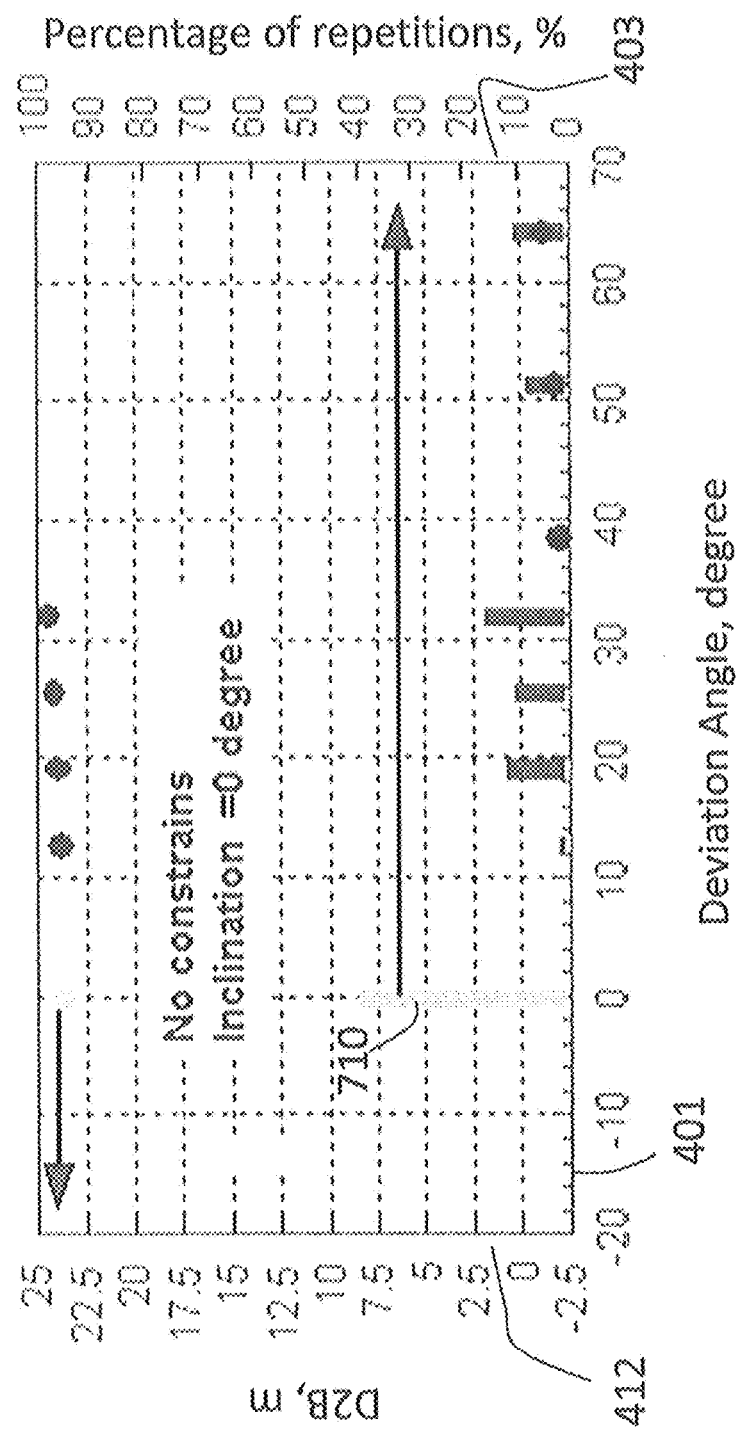
FIGS. 24 and 25 show results of a statistical inversion and constrained inversion, respectively, according to embodiments of the invention.
Figure 25:
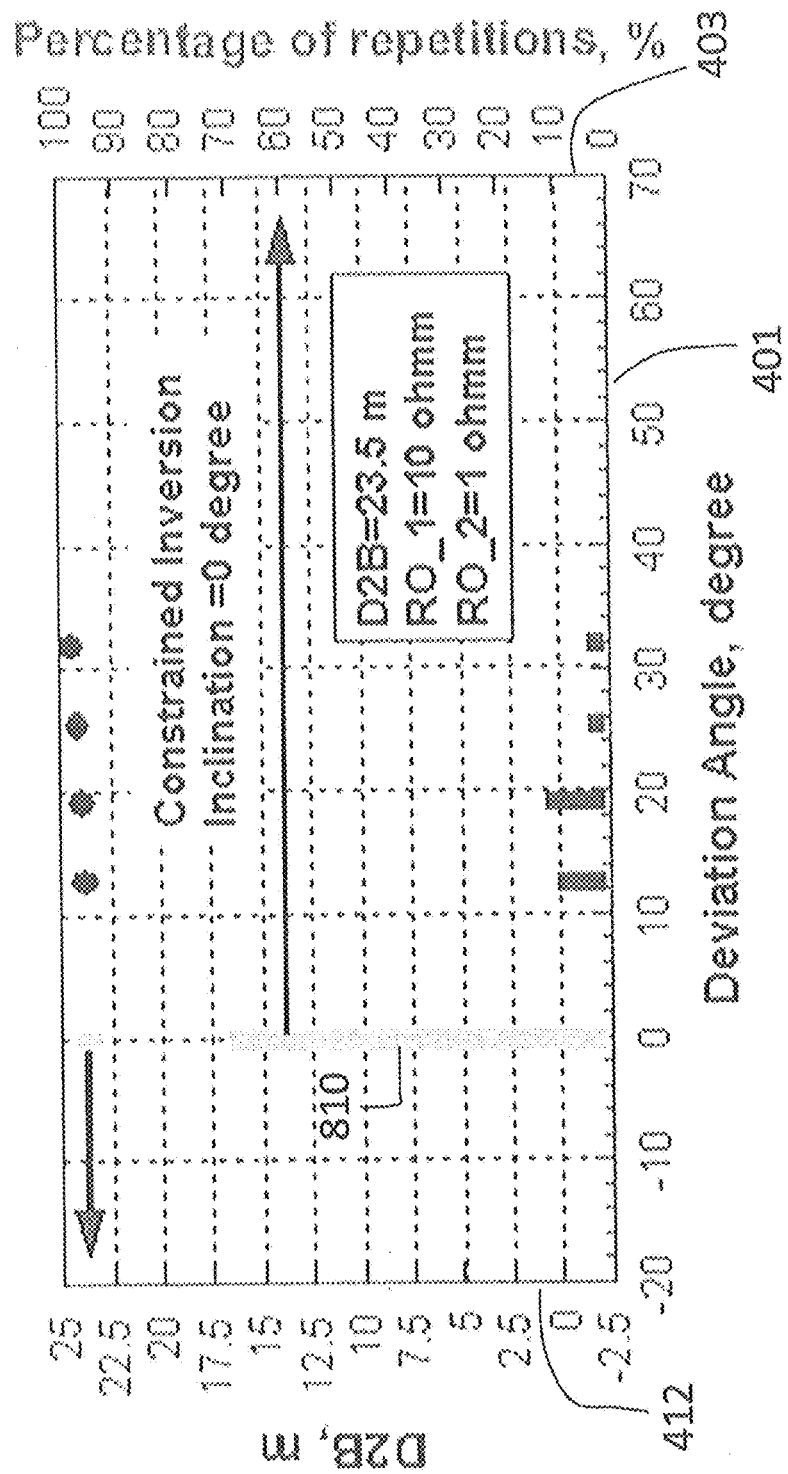

FIGS. 22 and 25 show results of a statistical inversion and constrained inversion, respectively, according to embodiments of the invention. The arrangement shown in FIG. 19 is used again with a reduced contrast in the resistivities of the two layers such that R1=10 ohm and R2=1 ohm. A distance D2B of 23.5 meters and 20% noise are used to generate the input data to test the inversion. FIG. 24, which shows the inversion results (100 runs) with no superimposition of constrains on the parameters. As indicated by FIG. 24, approximately 40% of the 100 runs resulted in determining the exact inclination angle, α, of 0 degrees as indicated by 710. As shown at block 330 of FIG. 20, the method of performing inversion may include constraining the inversions. This is illustrated at FIG. 25. FIG. 25 shows that constraining the inversions leads to an increase in the number of inversions that result in the exact angle of inclination, α, to approximately 70% (as indicated by 810). The distance D2B values are within a 5% error. In the exemplary case shown in FIG. 25, the specific constrain involves excluding all models that correspond with a boundary that is not located below the receiver from the search for the minimal residual norm (λ). Constrains (elimination of portions of the lookup table based on prior knowledge) help to avoid erroneous inversion results and reduce uncertainties in the inverted parameters.

The discussion above involves a step-function current excitation pulse. However, in practical cases, the current pulse shape used to induce current pulses in the formation 4 may differ from that of a step function. This deviation in the excitation pulse shape may be caused by a receiver amplifier or by noise suppression filters, for example. In some cases, a more sophisticated excitation pulse shape is desirable because it better-characterizes the formation 4. Regardless of the reason for the excitation pulse shape, taking into account the excitation pulse shape while performing inversion yields improved results.

As shown at block 340 of FIG. 20, the method of performing inversion may include correcting for the excitation pulse shape. The lookup table generated as discussed above with reference to block 310 (the original lookup table) may be modified at block 340. The transient signals S0(t) (from the original lookup table) are used to calculate the S1(t) signals corresponding to I(t) pulse excitation. This is done via a convolution integral:

$$S_1(t) = \int_0^t S_0(t-\tau) I'(\tau) d\tau \qquad [EQ.\ 2]$$

Modifying the previously generated original lookup table rather than regenerating another lookup table based on the excitation pulse shape eliminates a repetition of the time consuming process discussed above with regard to the generation of the original lookup table. The calculation of the integrals (EQ. 2) may require less than 10% of the time needed to generate the synthetic data for the step-function excitation (the original lookup table).

FIG. 20 shows that the method of performing inversion may include accounting for a special case at block 350. When the excitation current pulse is not a step function but is, instead, a linear pulse shape, this represents a special case. While the inversion for a linear pulse shape represents a special case, the use of a linear pulse shape in the investigation of a formation 4 may be typical. A modification of the original lookup table using EQ. 2 is not needed when a linear pulse shape has been used for the excitation current pulse. Instead, a time shift of the S0(t) signals may be sufficient. For example, for the following linear excitation pulse shape:

$$I(t) = \begin{cases} (t/t0) & \text{if } 0 < t < t0 \\ 1 & \text{if } t > t0 \end{cases} \quad [\text{EQ. 3}]$$

the signal S0(t) may be approximated by the following polynomial function:

$$S_0(t) = \frac{A}{t^n}, \quad [\text{EQ. 4}]$$
$$(2 < n < 4)$$

From EQ. 2, EQ. 3, and EQ. 4, S1(t) may be determined as:

$$S_1(t) = \frac{A}{t^n} \frac{1}{(n-1)\alpha} \left[ \frac{1}{(1-\alpha)^{n-1}} - 1 \right] \quad [\text{EQ. 5}]$$

if $t > t0$, where $\alpha = t0/t$

When α is small, EQ. 5 may be decomposed into the following series:

$$S_1(t) = \frac{A}{t^n} \left[ 1 + \frac{n\alpha}{2} + \frac{n(n+1)\alpha^2}{6} + \ldots \right] \quad [\text{EQ. 6}]$$

which may be re-written:

$$S_1(t) = S_0(t) - \frac{t_0}{2} S_0'(t) + \frac{2}{3} \left[ \frac{t_0}{2} \right]^2 S_0''(t) - \ldots \quad [\text{EQ. 7}]$$

For the time-shifted signal (S0(t−τ)), the following Taylor series applies:

$$S_0(t - \tau) = S_0(t) - \tau S_0'(t) + \frac{\tau^2}{2} S_0''(t) - \ldots \quad [\text{EQ. 8}]$$

By comparing EQ. 7 and EQ. 8, it becomes evident that, in a first order approximation, the signal S1(t), corresponding to the linear pulse shape, may be presented as S0(t) with a time shift Δt of t0/2. A relative error c due to this approximation is given by:

$$\varepsilon = \frac{S_1(t) - S_0(t)}{S_0(t)} = -\Delta t \frac{S_0'(t)}{S_0(t)} \approx \Delta t \frac{n}{t} \quad [\text{EQ. 9}]$$

As indicated by EQ. 9, the error c decreases as time (t) increases and, therefore, becomes negligible at a relatively late stage.

Figure 26:
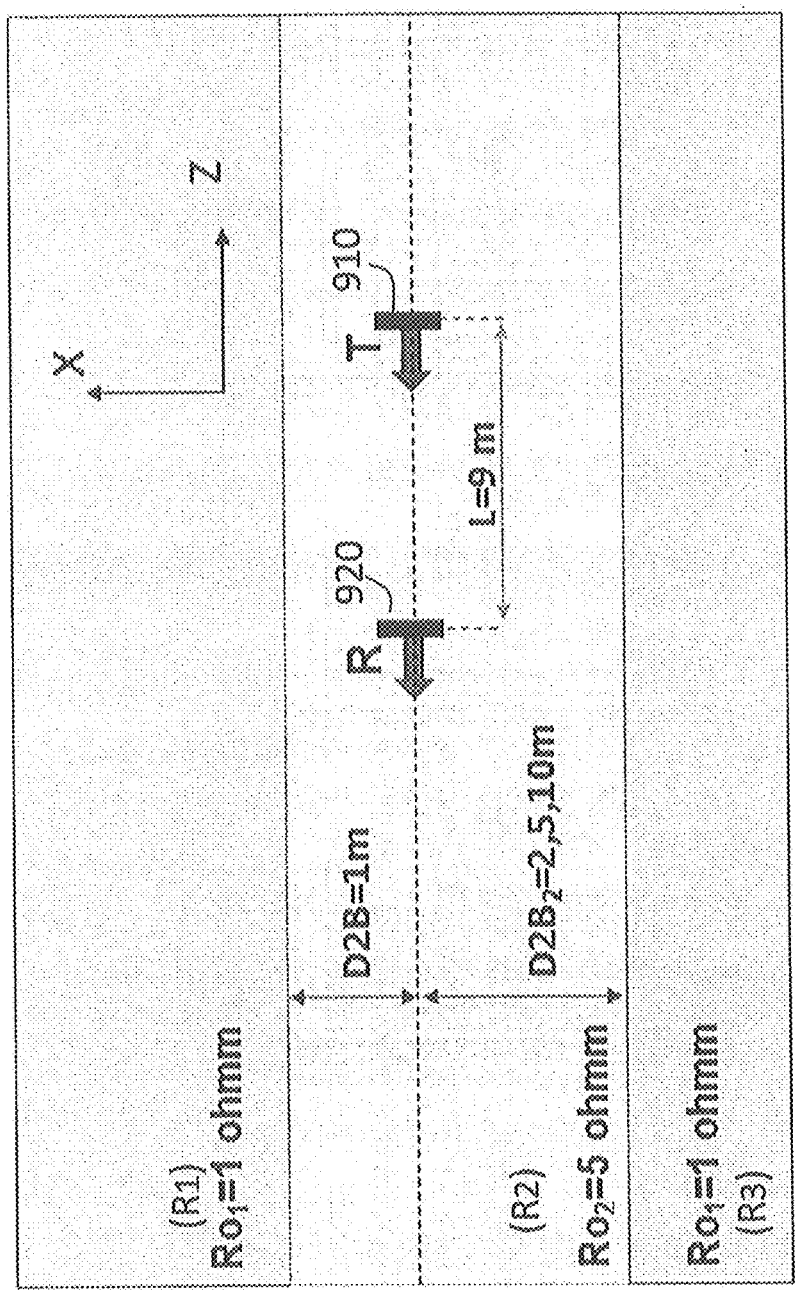
FIG. 26 illustrates an arrangement employing the inversion method according to embodiments of the invention.

FIG. 26 illustrates an arrangement employing the inversion method according to embodiments of the invention. A convolution-based approach (as discussed with reference to block 340) is used in the exemplary case of a parabolic pulse shape. As shown in FIG. 26, there are three formation layers. The model has five parameters: three resistivities associated with the three layers and two distances, D2B1 and D2B2, corresponding with the location of the induction tool 11 with respect to the upper and lower boundaries of the illustrated middle layer in FIG. 26. The transient processes, excited by a three-component x, y, z-transmitter 910, are measured by a three-component receiver 920 in the exemplary case. The parabolic pulse shape of the excitation current pulse is described as:

$$I(t) = -\frac{4}{T^2} t^2 + \frac{4}{T} t \quad [\text{EQ. 10}]$$

where T=7 μs and the pulse duration is 5 μs (0<t<5 μs).

Initially, three five-parametric original lookup tables, corresponding to xx, yy, and zz components, and a step-function excitation pulse are generated. Then, using EQ. 2, three lookup tables of data S1(t) (modified lookup tables) are generated for the parabolic pulse shape given by EQ. 10. These lookup tables comprise the synthetic data used in the inversion of received data. The exemplary model used to generate three sets of the input data is a three-layered model, with each model using a different distance from the tool to the bottom boundary (D2B$_2$). The three models use D2B$_2$ values of 1, 5, and 10 meters. The D2B$_1$ value is 1 meter for all three models. Resistivity of the first (R$_1$) and third (R$_3$) layers (Ro$_1$) is 1 ohm, and resistivity of the second (R$_2$) layer (Ro$_2$) is 5 ohm. Measurements are assumed to start 2 μs after switching on the current in the transmitter 910 and to last 0.405 ms. No cross components (e.g., xy) are used, and random, normally distributed 20% noise (as a percentage of signal level) is added to the input data. Table 1 shows the five parameters in each column and, for each of the three models, includes the parameter value used to generate the input and the parameter value determined by the inversion.

TABLE 1

| R$_1$, OHM | R$_2$ OHMM | R$_3$ OHMM | D2B$_1$, M | D2B$_2$, M |
|---|---|---|---|---|
| MODEL$_1$: 1.0 | MODEL$_1$: 5.00 | MODEL$_1$: 1.00 | MODEL$_1$: 1.0 | MODEL$_1$: 2.0 |
| INVERSION: 1.00 | INVERSION: 5.46 | INVERSION: 1.62 | INVERSION: 0.7 | INVERSION: 1.89 |
| MODEL$_2$: 1.0 | MODEL$_2$: 5.00 | MODEL$_2$: 1.0 | MODEL$_2$: 1.00 | MODEL$_2$: 5.0 |
| INVERSION: 1.0 | INVERSION: 5.46 | INVERSION: 1.0 | INVERSION: 0.97 | INVERSION: 5.14 |
| MODEL$_3$: 1.0 | MODEL$_3$: 5.00 | Model$_3$: 1.00 | MODEL$_3$: 1.0 | MODEL$_3$: 10.0 |
| INVERSION: 1.0 | INVERSION: 4.28 | INVERSION: 5.46 | INVERSION: 0.97 | INVERSION: 0.5 |

As Table 1 indicates, for the first model (first row of Table 1), the worst determined parameter is the resistivity of the third ($R_3$) layer, which evidences an error of approximately 60%. The D2B2 parameter, for example, only evidences an error of 5%. The second model (second row of Table 1) shows inversion results that all have less than 10% error associated with them. When D2B2 was increased to 10 meters (model 3, third row of Table 1), the inversion failed to find the resistivity of the third ($R_3$) layer and $D2B_2$. These results indicate sensitivity of the data to the unresolved parameters. The result (for model 3, for example) may be improved by extending an observation time interval. An extended observation time interval (from the exemplary interval starting at 2 µs and extending 0.405 ms) may improve sensitivity of the data to the third layer (associated with $R_3$) and reduce the error in the inverted parameters.

In support of the teachings herein, various analysis components may be used, including a digital and/or an analog system. For example, the downhole electronics 9 or the surface computer processing system 15 may be used to implement the methods disclosed herein and may include digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure. Processed data such as a result of an implemented method may be transmitted as a signal via a processor output interface to a signal receiving device. The signal receiving device may be a display monitor or printer for presenting the result to a user. Alternatively or in addition, the signal receiving device may be memory or a storage medium. It can be appreciated that storing the result in memory or the storage medium will transform the memory or storage medium into a new state (containing the result) from a prior state (not containing the result). Further, an alert signal may be transmitted from the processor to a user interface if the result exceeds a threshold value.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first," "second" and the like do not denote a particular order, but are used to distinguish different element types. The term "configured" relates to a structural limitation of an apparatus to perform the task or function for which the apparatus is configured.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for steering a drill bit drilling a borehole further in an earth formation in response to imaging the earth formation, the method comprising:
    conveying a carrier through the borehole penetrating the formation;
    inducing time-dependent electrical currents in the formation at a plurality of depths using a downhole resistivity tool disposed at the carrier;
    measuring time-dependent transient electromagnetic (TEM) signals induced by the formation responsive to the electrical currents using the downhole resistivity tool;
    estimating an apparent resistivity (AR) value and an apparent distance to a bedding plane (AD2B) value for each of a plurality of samples derived from the TEM measurements using a processor, wherein each sample corresponds to a discrete time window of the TEM measurements;
    estimating an inversion-based resistivity (IB-R) value and an inversion-based distance to a bedding plane (IB-D2B) value at a first sample of each consecutive depth interval using the processor, wherein each depth interval comprises a plurality of consecutive samples;
    determining a difference between the AR and AD2B values and the corresponding IB-R and IB-D2B values using the processor;
    generating an image of the earth formation using the AR and AD2B values for the entire interval comprising the first sample using the processor if the difference is less than a threshold value at the first sample;
    estimating an IB-R value and an IB-D2B value for each of the samples in the entire interval and generating an image of the earth formation using the IB-R and IB-D2B values for the entire interval comprising the first sample if the difference is greater than the threshold value using the processor; and
    steering the drill bit in a selected direction in response to the image to drill the borehole further in the earth formation using a drilling system comprising a steering apparatus.

2. The method according to claim 1, wherein the threshold value is between 10% and 50% of corresponding AR and AD2B values.

3. The method according to claim 1, further comprising transmitting an output signal via an output interface to a signal receiving device configured to display the image to a user.

4. The method according to claim 3, wherein the signal receiving device is a display monitor or a printer.

5. The method according to claim 1, further comprising storing digital values representing the generated image in memory or a storage medium thereby transforming the memory or storage medium from a prior state not containing image to a new state containing the image.

6. The method according to claim 1, further comprising looking up the IB resistivity value in a look-up table.

7. The method according to claim 6, wherein the look-up table comprises (a) a first set of tables based on two-layered formation models where model parameters include the resistivity values of the two layers, a distance to a bedding plane, and a relative dip, (b) a second set of tables based on three-layered formation models, where the tool stays horizontal and is in either the upper or bottom layer, and model parameters include the resistivity values of the three layers, and two distances to two bedding planes, or (c) a third set of tables based on three-layered formation models, where the tool stays horizontal and is in the middle layer, and model parameters include the resistivity values of the three layers, and two distances to two bedding planes.

8. The method according to claim 6, further comprising generating a first lookup table based on a step-function excitation current pulse shape.

9. The method according to claim 8, further comprising generating a second lookup table as a time-shifted version of the first lookup table for a linear excitation current pulse shape.

10. The method according to claim 8, further comprising generating a third lookup table by recalculating the first lookup table using a convolution integral for an excitation current pulse shape other than the step-function excitation current pulse shape and a linear excitation current pulse shape.

11. The method according to claim 1, wherein estimating the apparent resistivity value for each of the plurality of samples comprises determining for each sample a simulated homogeneous formation that provides a best fit of resistivity for the sample.

12. The method according to claim 11, wherein determining for each sample comprises identifying, from a plurality of simulated homogeneous formations, the simulated homogeneous formation having synthetic responses that provide the best fit for the sample, wherein the synthetic responses are determined using the respective simulated homogeneous formation and know parameters of the downhole resistivity tool.

13. The method according to claim 11, further comprising using a least squares minimization technique to provide the best fit.

14. The method according to claim 1, wherein inducing time-dependent electrical currents comprises changing a magnetic of a transmitter in the downhole resistivity tool.

15. The method according to claim 1, further comprising estimating the apparent resistivity value for each of the plurality of samples derived from the TEM measurement while conducting drilling operations in the borehole.

16. An apparatus for steering a drill bit for drilling a borehole further in an earth formation in response to imaging the earth formation, the apparatus comprising:
a carrier configured to be conveyed through a borehole penetrating the formation;
a transmitter disposed on the carrier and configured to induce time-dependent electrical currents in the formation;
a receiver disposed on the carrier and configured to provide a time-dependent transient electromagnetic (TEM) signal induced the formation responsive to the electrical currents;
a processor and a non-transitory computer-readable medium accessible to the processor with instructions thereon that when executed by the processor cause the processor to:
measure time-dependent transient electromagnetic (TEM) signals induced by the formation responsive to the electrical current using the downhole resistivity tool;
estimate an apparent resistivity (AR) value and an apparent distance to a bedding plane (AD2B) value for each of a plurality of samples derived from the TEM measurements using a processor, wherein each sample corresponds to a discrete time window of the TEM measurements;
estimate an inversion-based resistivity (IB-R) value and an inversion-based distance to a bedding plane (IB-D2B) value at a first sample of each consecutive depth interval, wherein each depth interval comprises a plurality of consecutive samples;
determine a difference between the AR and AD2B values and the corresponding IB-R and IB-D2B values using the processor;
generate an image of the earth formation using the AR and AD2B values for the entire interval comprising the first sample using the processor if the difference is less than a threshold value at the first sample; and
estimate an IB-R value and an IB-D2B value for each of the samples in the entire interval and generate an image of the earth formation using the IB-R and IB-D2B values for the entire interval comprising the first sample if the difference is greater than the threshold value;
a steering apparatus configured to steer the drill bit in a selected direction in response to the image to drill the borehole further in the earth formation.

17. A non-transitory computer readable medium comprising computer executable instructions for steering a drill bit drilling a borehole further in an earth formation in response to imaging the earth formation that when executed by a computer implements a method comprising:
estimating an apparent resistivity (AR) value and an apparent distance to a bedding plane (AD2B) value for each of a plurality of samples derived from measurements of time-dependent transient electromagnetic (TEM) signals in a borehole penetrating the formation responsive to a TEM current in the formation, wherein each sample corresponds to a discrete time window of the TEM measurements;
estimating an inversion-based resistivity (IB-R) value and an inversion-based distance to a bedding plane (IB-D2B) value at a first sample of each consecutive depth interval, wherein each depth interval comprises a plurality of consecutive samples;
determining a difference between the AR and AD2B values and the corresponding IB-R and IB-D2B values using the processor;
generating an image of the earth formation using the AR and AD2B values for the entire interval comprising the first sample using the processor if the difference is less than a threshold value at the first sample;
estimating an IB-R value and an IB-D2B value for each of the samples in the entire interval and generating an image of the earth formation using the IB-R and IB-D2B values for the entire interval comprising the first sample if the difference is greater than the threshold value; and steering the drill bit in a selected direction in response to the image to drill the borehole further in the earth formation using a drilling system comprising a steering apparatus.

* * * * *